(12) United States Patent
Hester et al.

(10) Patent No.: US 7,492,773 B2
(45) Date of Patent: Feb. 17, 2009

(54) MEDIA ACCESS CONTROL AND DISTRIBUTED DATA PROCESSING USING MEDIATION DEVICES IN AN ASYNCHRONOUS NETWORK

(75) Inventors: Lance Eric Hester, Davie, FL (US); Edgar Herbert Callaway, Jr., Boca Raton, FL (US); Jian Huang, Coral Springs, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 963 days.

(21) Appl. No.: 10/443,428

(22) Filed: May 22, 2003

(65) Prior Publication Data
US 2004/0042501 A1 Mar. 4, 2004

Related U.S. Application Data

(60) Provisional application No. 60/383,058, filed on May 23, 2002.

(51) Int. Cl.
*H04L 12/56* (2006.01)

(52) U.S. Cl. .................. 370/401; 370/503

(58) Field of Classification Search .......... 370/311, 370/236.1, 313, 342, 395.4, 428, 429, 304, 370/297, 324, 350, 395.62, 503, 507, 510, 370/401
See application file for complete search history.

(56) References Cited

U.S. PATENT DOCUMENTS

| | | | |
|---|---|---|---|
| 4,313,036 A | 1/1982 | Jabara et al. | |
| 4,534,061 A | 8/1985 | Ulug | |
| 4,794,649 A | 12/1988 | Fujiwara | |
| 4,816,989 A * | 3/1989 | Finn et al. .......... | 709/248 |
| 5,128,938 A | 7/1992 | Borras | |
| 5,241,542 A | 8/1993 | Natarajan et al. | |
| 5,278,831 A | 1/1994 | Mabey et al. | |
| 5,329,531 A | 7/1994 | Diepstraten et al. | |
| 5,371,734 A | 12/1994 | Fischer | |
| 5,418,835 A | 5/1995 | Frohman et al. | |
| 5,530,846 A * | 6/1996 | Strong .......... | 713/400 |
| 5,533,100 A | 7/1996 | Bass et al. | |
| 5,584,048 A | 12/1996 | Wieczorek | |
| 5,590,396 A | 12/1996 | Henry | |
| 5,636,243 A | 6/1997 | Tanaka | |
| 5,699,409 A | 12/1997 | Kojima | |
| 5,778,052 A | 7/1998 | Rubin et al. | |

(Continued)

OTHER PUBLICATIONS

Gummalla, Ajay Chandra V., and John O. Limb. "Wireless Medium Access Control Protocols," IEEE Communications Surveys, Second Quarter 2000, pp. 2-15, v. 3, n. 2.

(Continued)

*Primary Examiner*—Ricky Ngo
*Assistant Examiner*—Gary Mui

(57) ABSTRACT

A low power consumption protocol for low power communication devices attached to an asynchronous network is described. In this protocol, one or more mediation devices (MDs) facilitate data processing capabilities in the network, whether in a dedicated MD or distributed MD network environment. These capabilities may be provided by the functions of packet caching, removal of replicated packets, and multiple communication types performed by the one or more MDs in accordance with a common synchronization schedule (2510) managed by the one or more MDs and communicated to other devices in the network (2530).

39 Claims, 16 Drawing Sheets

U.S. PATENT DOCUMENTS

| | | | |
|---|---|---|---|
| 5,797,094 A * | 8/1998 | Houde et al. ............. 455/412.2 |
| 5,845,204 A | 12/1998 | Chapman et al. |
| 5,940,771 A | 8/1999 | Gollnick et al. |
| 5,943,397 A | 8/1999 | Gabin et al. |
| 5,991,287 A | 11/1999 | Diepstraten et al. |
| 5,991,635 A | 11/1999 | Dent et al. |
| 6,018,642 A | 1/2000 | Adachi |
| 6,044,069 A | 3/2000 | Wan |
| 6,047,200 A * | 4/2000 | Gibbons et al. ............. 455/574 |
| 6,058,289 A | 5/2000 | Gardner et al. |
| 6,104,788 A * | 8/2000 | Shaffer et al. ............. 379/93.17 |
| 6,138,019 A | 10/2000 | Trompower et al. |
| 6,192,230 B1 | 2/2001 | Van Bokhorst et al. |
| 6,259,772 B1 | 7/2001 | Stephens et al. |
| 6,285,892 B1 | 9/2001 | Hulyalkar |
| 6,317,415 B1 * | 11/2001 | Darnell et al. ............. 370/230 |
| 6,335,927 B1 * | 1/2002 | Elliott et al. ............. 370/352 |
| 6,351,522 B1 | 2/2002 | Vitikainen |
| 6,356,538 B1 | 3/2002 | Li |
| 6,370,146 B1 | 4/2002 | Higgins et al. |
| 6,385,174 B1 | 5/2002 | Li |
| 6,414,955 B1 * | 7/2002 | Clare et al. ............. 370/390 |
| 6,456,599 B1 | 9/2002 | Elliott |
| 6,480,476 B1 | 11/2002 | Willars |
| 6,484,027 B1 | 11/2002 | Mauney et al. |
| 6,516,007 B1 * | 2/2003 | Hong et al. ............. 370/515 |
| 6,522,873 B1 | 2/2003 | Moles et al. |
| 6,564,074 B2 | 5/2003 | Romans |
| 6,574,266 B1 | 6/2003 | Haartsen |
| 6,580,721 B1 | 6/2003 | Beshai |
| 6,671,525 B2 | 12/2003 | Allen et al. |
| 6,744,750 B1 | 6/2004 | Berger |
| 6,748,502 B2 * | 6/2004 | Watanabe et al. ............. 711/158 |
| 6,791,949 B1 | 9/2004 | Ryu et al. |
| 6,816,460 B1 | 11/2004 | Ahmed et al. |
| 6,816,493 B2 * | 11/2004 | Shi et al. ............. 370/395.4 |
| 6,826,153 B1 * | 11/2004 | Kroon ............. 370/235 |
| 6,836,463 B2 | 12/2004 | Garcia-Luna-Aceves et al. |
| 6,845,091 B2 | 1/2005 | Ogier et al. |
| 6,928,061 B1 * | 8/2005 | Garcia-Luna-Aceves et al. . 370/329 |
| 6,968,052 B2 * | 11/2005 | Wullert, II ............. 379/210.01 |
| 6,975,655 B2 | 12/2005 | Fischer et al. |
| 6,982,960 B2 * | 1/2006 | Lee et al. ............. 370/254 |
| 7,020,501 B1 * | 3/2006 | Elliott et al. ............. 455/574 |
| 7,133,373 B2 | 11/2006 | Hester et al. |
| 7,173,927 B2 * | 2/2007 | Kumar et al. ............. 370/352 |
| 7,251,256 B1 * | 7/2007 | Barry et al. ............. 370/503 |
| 7,269,162 B1 * | 9/2007 | Turner ............. 370/352 |
| 2002/0126627 A1 | 9/2002 | Shi et al. |
| 2002/0163932 A1 * | 11/2002 | Fischer et al. ............. 370/465 |
| 2003/0114204 A1 | 6/2003 | Allen et al. |
| 2003/0123634 A1 | 7/2003 | Chee |
| 2003/0185170 A1 * | 10/2003 | Allen et al. ............. 370/329 |
| 2006/0291643 A1 | 12/2006 | Pfaff et al. |

OTHER PUBLICATIONS

Guo, Chunlong, Lizhi Charlie Zhong, and Jan M. Rabaey. "Low Power Distributed MAC for Ad Hoc Sensor Radio Networks," Proc. IEEE Global Telecom. Conf., 2001, v. 5, pp. 2944-2948.

Gutierrez, Jose A., Marco Naeve, Ed Callaway, Monique Bourgeois, Vinay Mitter, and Bob Heile. "IEEE 802.15.4: A Developing Standard for Low-Power Low-Cost Wireless Personal Area Networks," IEEE Network, Sep./Oct. 2001, pp. 12-19, v. 15, n. 5.

Pottie, G. J., and W. J. Kaiser. "Wireless Integrated Network Sensors," Communications of the ACM, May 2000, pp. 51-58, v. 43, n. 5.

Rabaey, Jan M., M. Josie Ammer, Julio L. Da Silva Jr., Danny Patel, and Shad Roundy. "PicoRadio Supports Ad Hoc Ultra-Low Power Wireless Networking," IEEE Computer, Jul. 2000, pp. 42-48, v. 33, n. 7.

Shi, Qicai, and Edgar H. Callaway Jr. "An Ultra-Low Power Protocol for Wireless Networks," Proc. 5th World Mult-Conference on Systemics, Cybernetics and Informatics, 2001, pp. 321-325, v. IV.

Zhong, Lizhi Charlie, Rahul Shah, Chunlong Guo, and Jan Rabaey. "An Ultra-Low Power and Distributed Access Protocol for Broadband Wireless Sensor Networks," Networld+Interop: IEEE Broadband Wireless Summit, 2001, Las Vegas.

\* cited by examiner

−PRIOR ART−

−PRIOR ART−

MEDIA ACCESS CONTROL AND DISTRIBUTED DATA PROCESSING USING MEDIATION DEVICES IN AN ASYNCHRONOUS NETWORK

RIGHT OF PRIORITY

This application claims priority to and benefit of earlier filing date of U.S. Provisional Application No. 60/383,058, filed May 23, 2002, the content of which is incorporated herein by reference.

CROSS REFERENCE TO RELATED APPLICATIONS

This application is related to the following copending applications entitled "Beacon Assisted Hybrid Asynchronous Wireless Communications Protocol" PCT/US02/09323, "System and Method for Asynchronous Communications Employing Direct and Indirect Access Protocols" Ser. No. 10/108,116, "A Multiple Access Protocol and Structure for Communication Devices in an Asynchronous Network" U.S. Pat. No. 6,084,712, and are herein incorporated by reference.

FIELD OF THE INVENTION

The present invention relates generally to communication networks and more specifically to the use of media access control and distributed data processing in asynchronous communication networks.

BACKGROUND OF THE INVENTION

In communication networks, asynchronous transmission of information is often the technique used when communicating information between one or more communication devices within a communication network. Asynchronous transmission is often used when low power devices make up the network. These low power devices can use a low communication duty cycle frame structure in order to minimize the amount of power used while not actively communicating with other network devices, but the use of a low communication duty cycle frame structure often implies that device availability is reduced. In wireless communication networks, a fundamental challenge is maintaining high availability communications while using low power wireless communication devices.

The neuRFon™ device by Motorola is an example of a low power, low cost, small size, and simple wireless device. The neuRFon™ device network is a zero-configuring, self-organizing, asynchronous network containing multiple neuRFon™ devices. For this network, power consumption and cost are two major concerns.

To lower the power consumption, the average communication duty cycle of all the devices in the described network has to be decreased to a minimum. The average communication duty cycle refers to the fraction of time that the wireless device is able to send and receive messages. For the described asynchronous network, the average communication duty cycle may be set so low that the infrequent communications between a transmitter and a destined receiver become a problem. For example, device A may attempt to contact device B, but device B may not be able to receive messages due to its low average communication duty cycle. This will prevent device A from establishing contact.

A representative low average communication duty cycle frame structure, in which the above problem is illustrated, is shown in FIG. 1. Using this frame structure, a low average communication duty cycle device uses 1 ms to warm up, 1 ms to transmit and receive messages from other devices in its group, and is asleep for the remaining 998 ms of the 1 second cycle. This gives a communication duty cycle of about 0.1%, which is very power efficient.

The problem with this approach is illustrated in FIG. 2. FIG. 2 shows a small network comprising several low power, low average communication duty cycle devices, where each device is represented as a small dot. Referring again to FIG. 2, device A tries to talk to device B. If the low average communication duty cycle frame structure in FIG. 1 is assumed, both A and B devices are able to communicate only 0.1% of the time. If we further make the reasonable assumption that device A and device B don't each have access to the other's time schedule, the probability of device A to establish communication with device B is approximately 0.1%, which is too small for most applications.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
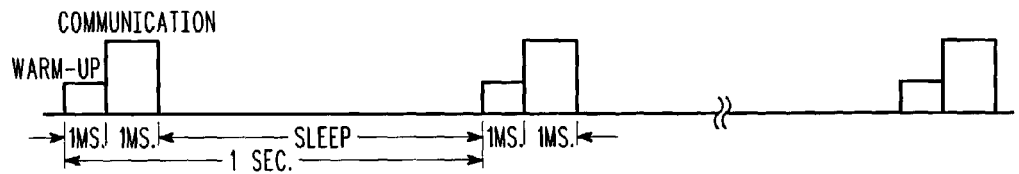
FIG. 1 is a low communication duty cycle frame structure, according to the prior art.
Figure 2:
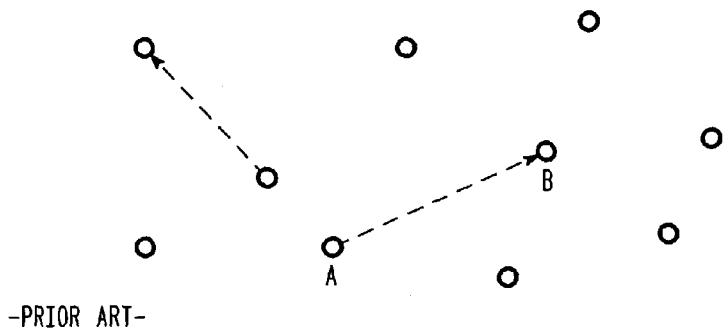
FIG. 2 is a low power communication device network, according to the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 3:
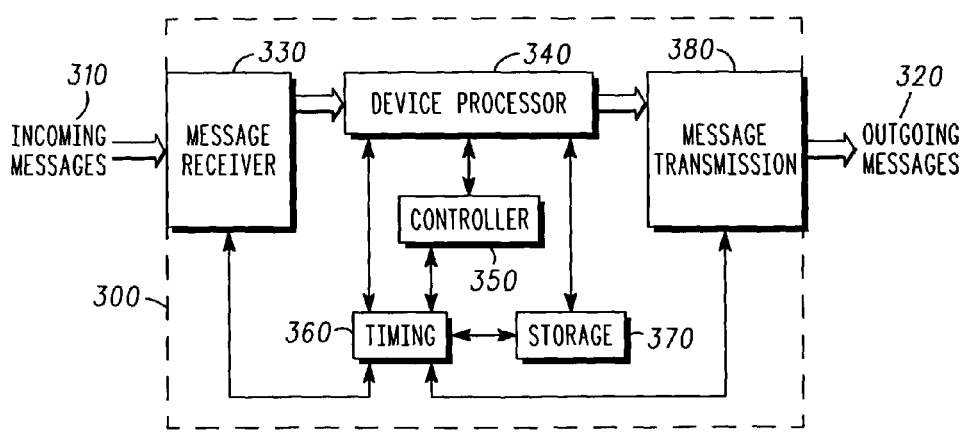
FIG. 3 is a block diagram illustrating the internal functionality of a low power device, in accordance with certain embodiments of the present invention.

Therefore, according to the present invention, a multiple access protocol and structure for communication devices in an asynchronous network is described. This multiple access protocol is applied to the situation in which there are multiple low power communication devices in an asynchronous communication network. These low power communication devices may be neuRFon™ devices, or any similar device capable of low power, low communication duty cycle, and low cost information transmission. Referring now to FIG. 3, a system level block diagram 300 of the internal operation of a low power communication device is shown. Incoming messages 310 are received by a message receiver 330 of the communication device, and are prepared for processing by device processor 340. Device processor 340 interacts with a controller 350, timing 360, and storage 370 in order to allow the communication device to receive and process incoming messages 310 from other communication devices in the network. The timing block 360 allows for synchronization between the communication device and other communication devices in the network, as well as providing a timing reference for internal device functionality. Device transmitter 380 receives messages from device processor 340, prepares messages for transmission, and transmits outgoing messages 320 to other communication devices in the network. One will recognize that the functional blocks illustrated in the system level block diagram 300 of FIG. 3 may be modified or combined without departing from the spirit and scope of a low power communication device that sends messages, receives messages, and processes messages. For instance, it is recognized that the functionality of processor 340 and controller 350 may be combined in a processing and control element if so desired.

In order to keep the power consumption at a minimum, and yet still achieve reliable communication, a mediation device (MD) is introduced. The MD acts as a mediator between communication devices within the network, and is capable of recording and playing back message related information. This is most useful when two communication devices are unable to establish contact. More than one MD may also be used in a large network, where each MD mediates for a group of low-power, low communication duty cycle communication devices. The MD has a relatively high communication duty cycle as compared to the low-power communication devices in the group and is thus able to store and forward messages between two or more low power communication devices in the asynchronous network. Note that the MD functionality may actually be a feature of the low power communication devices in the group. In this case, each low power communication device may be operable as a MD within the asynchronous network, with a low power communication device of the network being randomly chosen to temporarily operate as a MD of the group. This allows the overall network to remain a low power, low cost asynchronous network and each low power wireless device to remain a low communication duty cycle device, except when serving as a MD. Since a low power wireless device is a MD only occasionally, the average communication duty cycle of each low power wireless device can remain low. Distributing MD functionality across all the communication devices in the network also allows the communication devices to use energy mining in order to increase the average communication duty cycle of the communication devices in the network.

During normal asynchronous network operation, each communication device except those serving as MD has a low communication duty cycle frame structure. The communication duty cycle of the MD may be adapted to the design parameters of the network, so that changing the parameters of the MD has an impact on the availability of each communication device within communication range of the MD.

Figure 4:
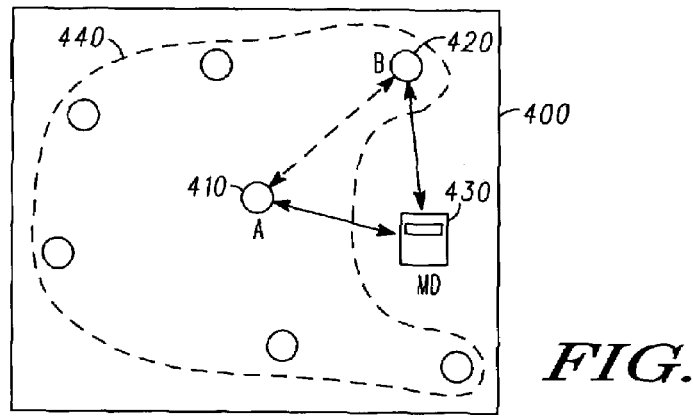
FIG. 4 is a network containing multiple low power devices and a single dedicated Mediation Device (MD), in accordance with certain embodiments of the present invention.

The present invention discloses a method and structure for a low power consumption protocol for low power wireless devices attached to an asynchronous network. Referring to FIG. 4, a simplified representation of a network 400 containing a plethora 440 of low power communication devices 410 and a dedicated MD 430 is shown, according to a first embodiment of the present invention. Each of the low power communication devices 410 of network 400 has a low communication duty cycle and must therefore rely upon dedicated MD 430 for reliable communication. Dedicated MD 430 has a high communication duty cycle in comparison to the non-MD low power devices 410, and can store messages destined for any of low power wireless devices 410 within the group 440.

Figure 5:
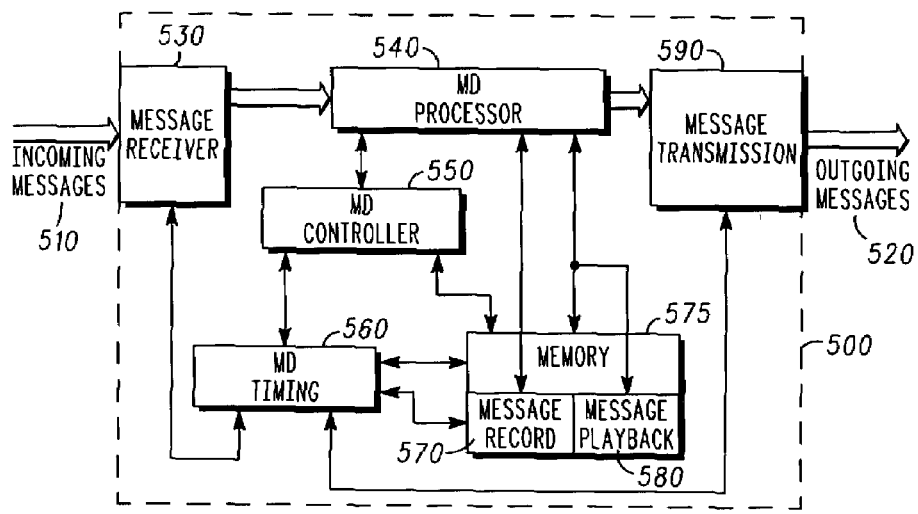
FIG. 5 illustrates the internal functionality of a dedicated MD, in accordance with certain embodiments of the present invention.

Referring now to FIG. 5, a system level block diagram 500 of the internal operation of a dedicated MD device 430 is shown. The dedicated MD device 430 is capable of sending and receiving several types of messages, including the source communication device id, the destination communication device id, the message, time of desired communication, message replay requests, control words, and device status messages. Incoming messages 510 are received by a MD message receiver 530 of the dedicated MD device 430, and are prepared for processing by device processor 540. MD Device processor 540 interacts with a controller 550, timing 560, and storage 575 in order to allow the MD 430 to receive, store, replay and process incoming messages 510 from other communication devices in the network. In addition to non-specific memory, the storage block 575 also includes message playback 580 and message record 570 memory, so that MD processor 540 can mediate requests from communication devices within the network to record messages, playback messages, and save communication device contact information. The timing block 560 allows for synchronization between the MD 430 and other communication devices in the network, as well as provides a timing reference for internal device functionality. Device transmitter 590 receives messages from device processor 540, prepares messages for transmission, and transmits outgoing messages 520 to other communication devices in the network. One skilled in the art will recognize that the functional blocks illustrated in the system level block diagram 500 of FIG. 5 may be modified or combined without departing from the spirit and scope of a low power communication device that sends messages, receives messages, and processes messages. For instance, it is recognized that the functionality of processor 540 and controller 550 may be combined in a processing and control element if so desired.

Figure 6:
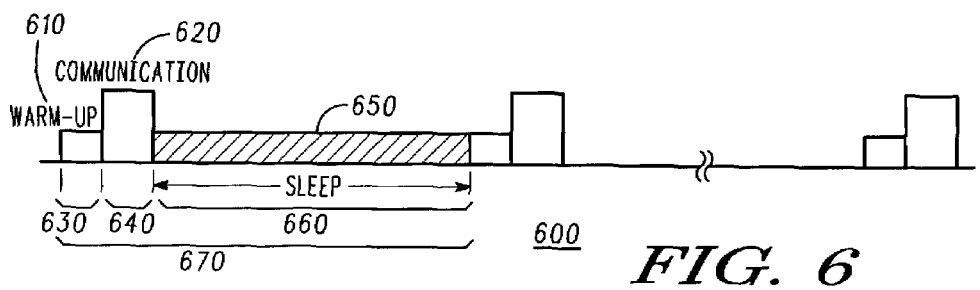
FIG. 6 is a low communication duty cycle frame structure for a low power device, in accordance with certain embodiments of the present invention.

Referring now to FIG. 6, a representative low communication duty cycle frame structure 600 characteristic of the low power, low communication duty cycle devices of the network is shown. A single frame 670 of low communication duty cycle frame structure 600 contains a warm-up block 610, a communication block 620, and a sleep block 650. Warm-up block 610 occurs first chronologically, and is a very small percentage of the overall frame duration. Warm-up block 610 is followed by communication block 620. Communication block 620 is also a small percentage of the overall frame duration. After communication block 620 ends, sleep block 650 begins. Sleep block 650 is a relatively high percentage of the overall frame duration in order to preserve the low communication duty-cycle characteristic of the device. Exemplary values are 1 ms for warm-up block 610, 1 ms for communication block 620, and 998 ms for sleep block 650, although these values can be changed significantly without departing from the invention. At the end of frame 670, the three-block cycle 610, 620, 650 is repeated for the next frame. This block order is preserved for all frames in the low communication duty cycle frame structure 400. In the preferred first embodiment, communication block 620 may be further subdivided into a transmit period and a receive period, although it will be clear to one of skill in the art that the communication devices in the network can have multiple transmit and receive periods within communication block 620. Under normal operation of the first preferred embodiment, the receive period occurs first, followed by a transmit period of equal duration. Under certain situations, such as synchronization between communication devices, the transmit period may occur before the receive period.

Figure 7:
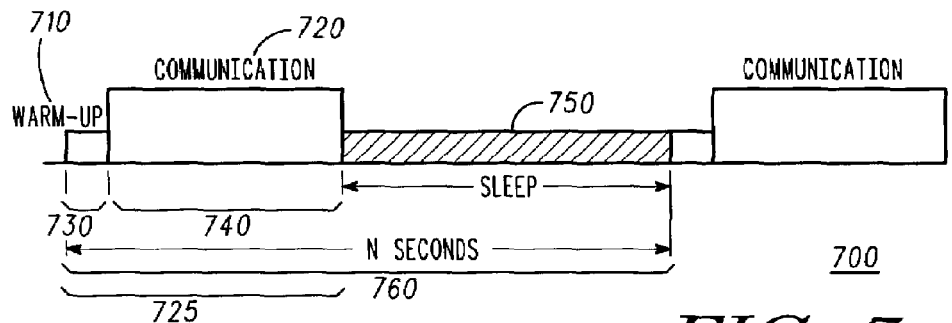
FIG. 7 is a high communication duty cycle frame structure for a dedicated MD, in accordance with certain embodiments of the present invention.

Referring now to FIG. 7, a representative high communication duty cycle frame structure 700 is shown. This high communication duty cycle frame 700 is representative of the dedicated MD communication duty cycle frame, according to the first embodiment. A single frame 725 of low communication duty cycle frame structure 700 contains a warm-up block 710 and a communication block 720. Warm-up block 710 occurs first chronologically, and is a very small percentage of the overall frame duration. Warm-up block 710 is followed by communication block 720. Communication block 720 is a relatively very large percentage of the overall frame duration. At the end of frame 725, sleep cycle 750 begins, which can last for several frames. Exemplary values are 1 ms for warm-up block 710, 2 seconds for communication block 720, and 100 seconds for sleep cycle 750. At the end of sleep cycle 750, warm-up block 710 and communication block 720 are repeated for the next frame. This block order is preserved for all frames in the high communication duty cycle frame structure 700. In the preferred first embodiment, communication block 720 may be further subdivided into a transmit period and a receive period, although it will be clear to one of ordinary skill in the art that the communication devices in the network can have multiple transmit and receive periods within communication block 720. Under normal operation of the first preferred embodiment, the receive period occurs first, followed by the transmit period of equal duration. It should also be noted that the length of the transmit period of communication block 720 should be long enough for the high communication duty cycle device to receive two complete transmit cycles of a low duty cycle device. This will ensure that a dedicated MD will be able to receive a transmission from any communication device within communication range.

Figure 8:
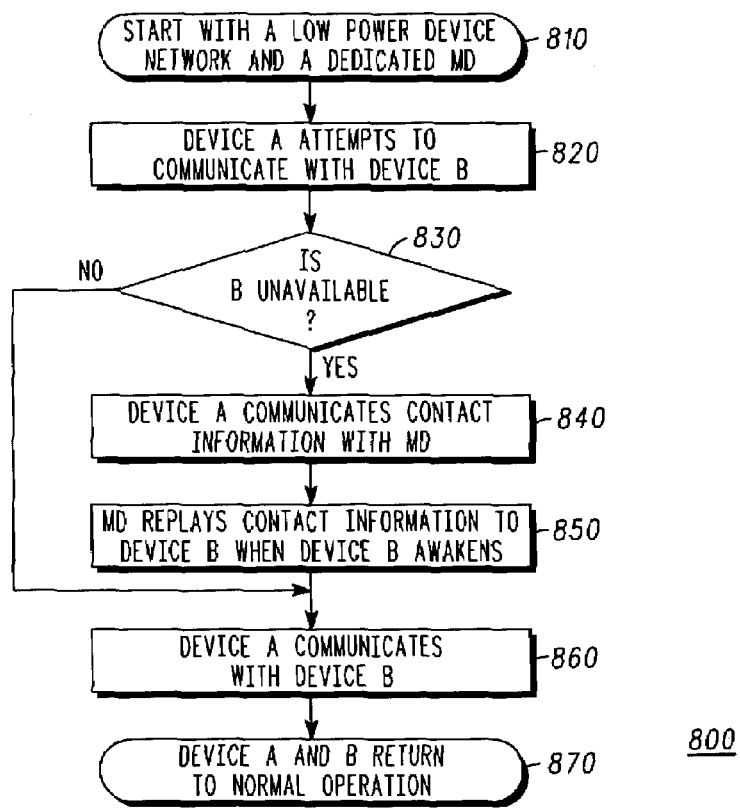
FIG. 8 is a flowchart for dedicated MD operation, in accordance with certain embodiments of the present invention.

Referring now to FIG. 8, a flow diagram 800 for applying the dedicated MD to communication between a communication device A, and a communication device B, according to the first preferred embodiment, is shown. In block 820, device A attempts to communicate with device B. If B is reachable, then decision block 830 evaluates to No and device A establishes communications with device B as shown in block 860. Device A and device B then return to normal operation, as shown in termination block 870. If the answer in decision block 830 is Yes, then device B is not available, and device A communicates contact information with the dedicated MD as shown in block 840. In block 850, dedicated MD replays the contact information for device B when device B is able to communicate. Device B uses this contact information to synchronize communications with device A. Device A is now able to communicate with device B, as shown in block 860. After device A communicates with device B, both devices return to normal operation, as shown in block 870. Note that device A can fail to reach device B when device B is in sleep mode, in transmit mode, out of range, or other similar reasons.

Figure 9:
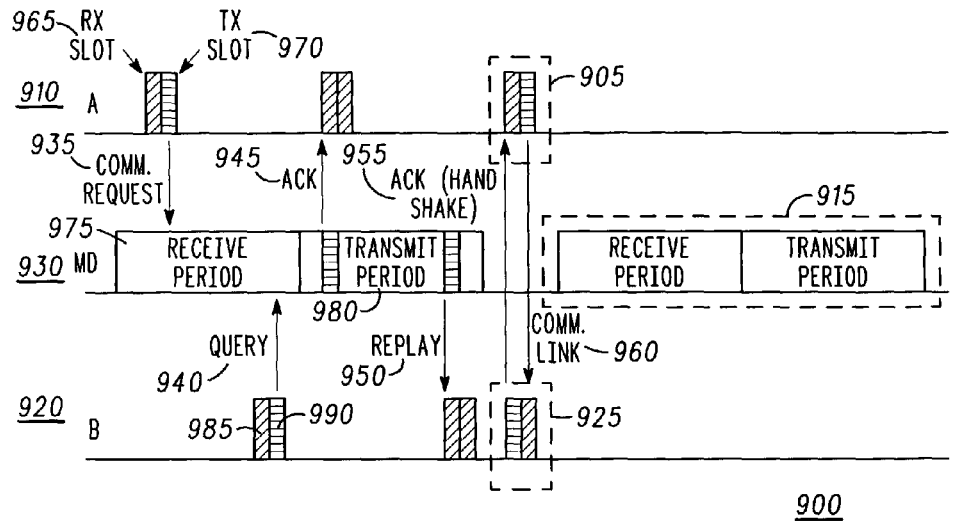
FIG. 9 is a timing diagram for communication between two low power devices and a dedicated MD when a query occurs later than the communication request, in accordance with certain embodiments of the present invention.
Figure 10:
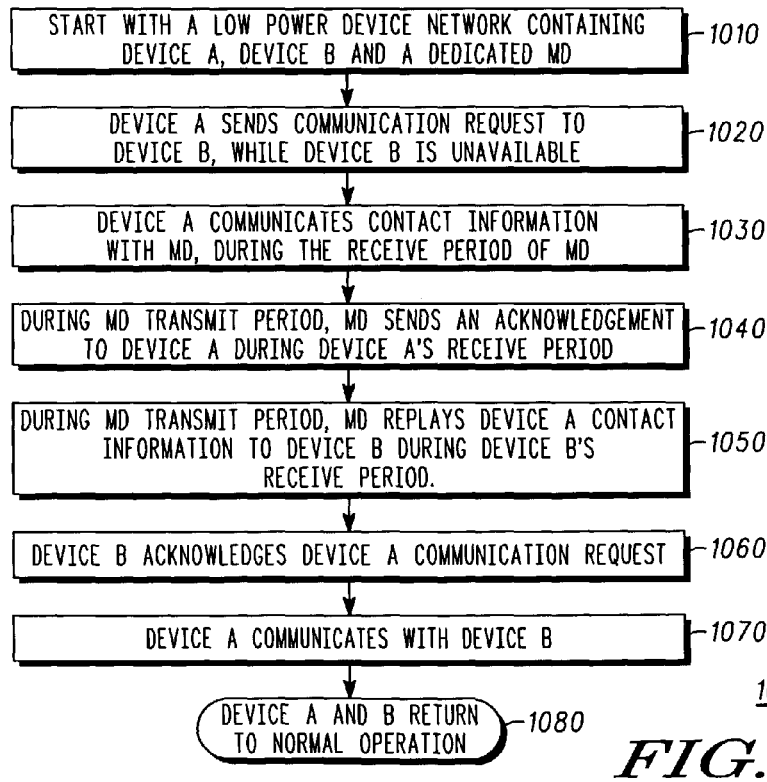
FIG. 10 is a flowchart for communication between two low power devices and a dedicated MD when the query occurs later than the communication request, in accordance with certain embodiments of the present invention.

Referring now to FIG. 9, a more detailed timing diagram is shown for the case described in FIG. 8, according to the first embodiment. As in FIG. 8, device A 910 attempts to communicate with device B 920, but is not successful, so dedicated MD 930 is used to mediate between device A 910 and device B 920 until device B 920 is able to communicate. Device A 910 is a low duty cycle device with a communication period containing a receive slot 965 and a transmit slot 970. Device B 920 is also a low duty cycle device with a communication period containing receive slot 985 and transmit slot 990. Dedicated MD 930 contains a communication period that is much longer than either communication period of device A 910 or device B 920. The communication period of dedicated MD 930 similarly contains a receive period 975 and a transmit period 980. Referring also to FIG. 10, the flowchart for the timing diagram of FIG. 9 is shown. The flow in block 1020 of FIG. 10, as well as the timing diagram of FIG. 9, assume that device A 910 has not been successful in communicating directly with device B 920. So, there is a need for device A 910 to use the dedicated MD 930 to store a communication request with device B 920. As shown in block 1030, device A 910 sends a communication request 935 to dedicated MD 930 during the transmit slot 970 of the communication period of device A 910. Communication request 935 is received by dedicated MD 930 during the receive slot 975 of the communication period of dedicated MD 930. Also during the receive period 975, device B 920 enters its communication period. Upon waking, device B 920 sends a query 940 using transmit slot 990 to dedicated MD 930 to check for messages. Note that both device A 910 and device B 920 are able to communicate with dedicated MD 930 during a single receive slot 975. The duration of receive slot 975 and transmit slot 980 of dedicated MD 930 should be chosen large enough that dedicated MD 930 is able to receive both communication request and query messages. Since MD 930 received communication request 935 from device A 910 prior to the query 940 from device B 920, during the transmission slot 980 of the communication period of dedicated MD 930 dedicated MD 930 first sends an acknowledgement 945 to device A 910 during receive slot 965 in the next communication period of device A 910, as indicated in block 1040. Dedicated MD 930 then sends a replay message 950 to device B 920 during the same transmit slot 980 of the communication period of dedicated MD 930, as indicated in block 1050. In the first preferred embodiment, the communication period of each communication device in the network occurs with a fixed period, so that dedicated MD 930 is able to sync with device B 920 without device B 920 sending synchronization information. However, other implementations of the second embodiment could require each communication device in the network to transmit explicit synchronization information to dedicated MD 930, so that the query message would contain synchronization information. Device B 920 now has enough information to enable communications with device A 910 without the use of dedicated MD 930. In order to synchronize with device A, device B uses timing information provided in the communication request 935 of device A 910, and swaps communication slots so that the transmit slot 990 precedes the receive slot 985 of device B 920. As shown in block 1060, device B 920 then sends an acknowledgement 955 to device A during the receive slot 965 of the communication period of device A. As shown in block 1070, device A 910 is now able to communicate a message 960 to device B 920 during the transmit slot 970 of device A 910 and the receive slot 985 of device B 920. Once the communication between device A 910 and device B 920 is complete, device A 910 and device B 920 return to normal operation, as shown in block 1080.

Figure 11:
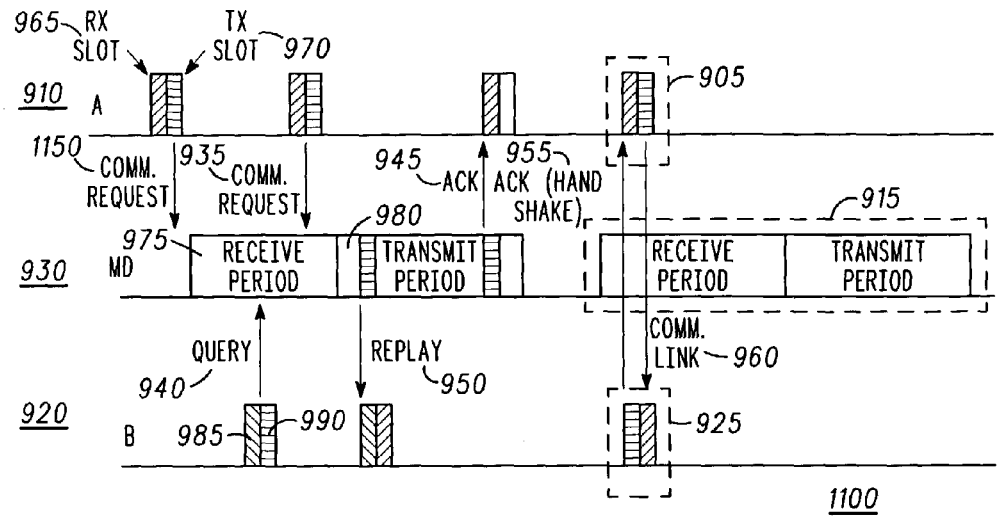
FIG. 11 is a timing diagram for communication between two low power devices and a dedicated MD when the query occurs earlier than the communication request, in accordance with certain embodiments of the present invention.
Figure 12:
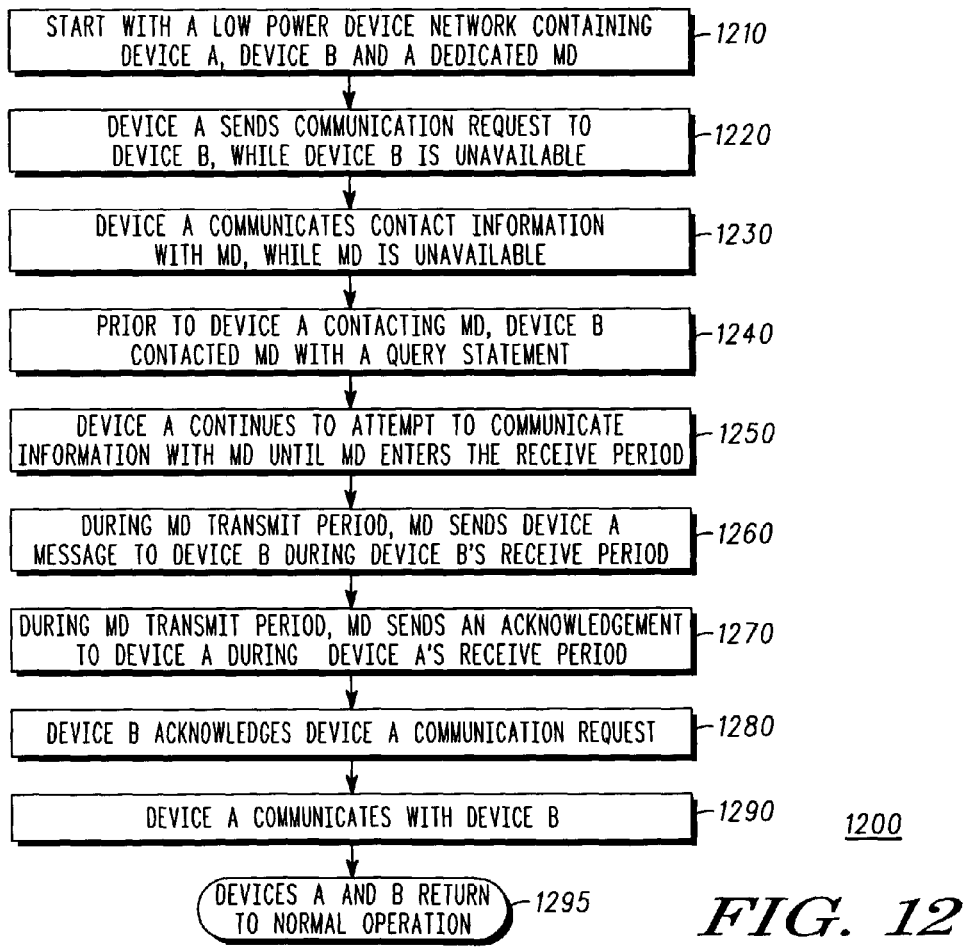
FIG. 12 is a flowchart for communication between two low power devices and a dedicated MD when the query occurs earlier than the communication request, in accordance with certain embodiments of the present invention.

The discussion above referring to FIG. 9 and FIG. 10, illustrated the sequence of communication operations and timing flow for the case in which the query from device B 920 is later than the communication request from device A 910. It is also possible for the query of device B 920 to precede the communication request of device A 910. This scenario is illustrated in the timing diagram of FIG. 11, and the flowchart of FIG. 12. The sequence of operations shown in FIG. 12 is identical to those in FIG. 9, except that device A 910 first attempts to communicate a communication request 1150 with dedicated MD 930 during a time that dedicated MD 930 is unavailable, as in block 1230. Since the dedicated MD 930 is not available, device A 910 has to wait until a communication period in which dedicated MD 930 has an active receive period 975. This delay means that device B 920 sends query 940 to the receive slot 975 of dedicated MD 930 prior to the communication request 935 of device A 910, as in block 1240. It is important to note that since both the transmit slot 975 and receive slot 980 of dedicated MD 930 are as long as two transmit periods of device A 910 or device B 920, during the transmit slot of dedicated MD 930, dedicated MD is able to replay message 950 to device B 920 and acknowledge 945 device A 910. This allows the handshake between device A 910 and device B 920 to proceed as in block 1060-1080. So, the ordering of the communication request 935 and the query 940 within a single receive slot 975 and the ordering of replay 950 and acknowledgement 945 within a single transmit slot 980 of dedicated MD 930 does not affect establishment of communications between device A 910 and device B 920.

Figure 13:
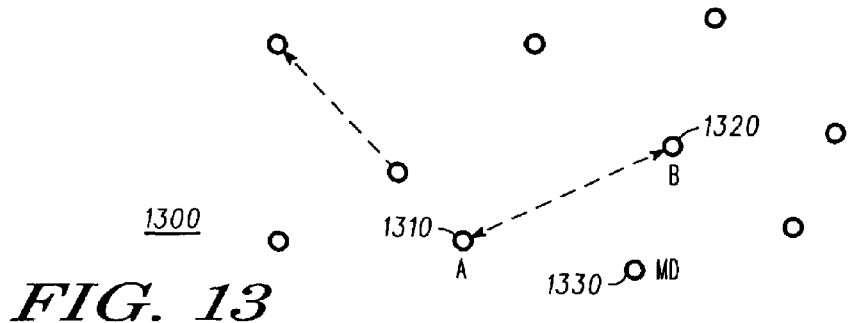
FIG. 13 is a network containing multiple low power devices and an additional low power device functioning as a MD, in accordance with certain embodiments of the present invention.

Instead of using dedicated MD 930, the functionality of a MD may be coupled to each of the plethora 440 of low power communication devices. Referring now to FIG. 13, a network 1300 containing a plethora of low power communication devices is shown, according to a second embodiment of the present invention. Each low power communication device of the low power communication devices can function as MD. In FIG. 13, low power communication device 1330 is functioning as a MD. Note that low power communication device 1330 is not a dedicated MD 930. The low power communication device of the low power communication devices that will function as MD is selected at random.

There are several approaches that may be used to select the next MD. The MD could be selected at random when the low power communications device acting as MD is not able to act as MD any longer. If each MD uses a randomly generated initial phase offset t0, then the distribution of MD functionality across the low power communication devices within the network should be uniform. This selection process will prevent collisions between two low power communications devices attempting to concurrently act as MD, but it requires coordination amongst the low power communication devices within the network. A second approach, and the one used in the second preferred embodiment, is to let each low power wireless device randomly determine when it will act as MD. In the case of two low power communication devices acting as MD, a collision avoidance strategy will be used to ensure only one MD is within communication range of a low power communication device.

Figure 14:
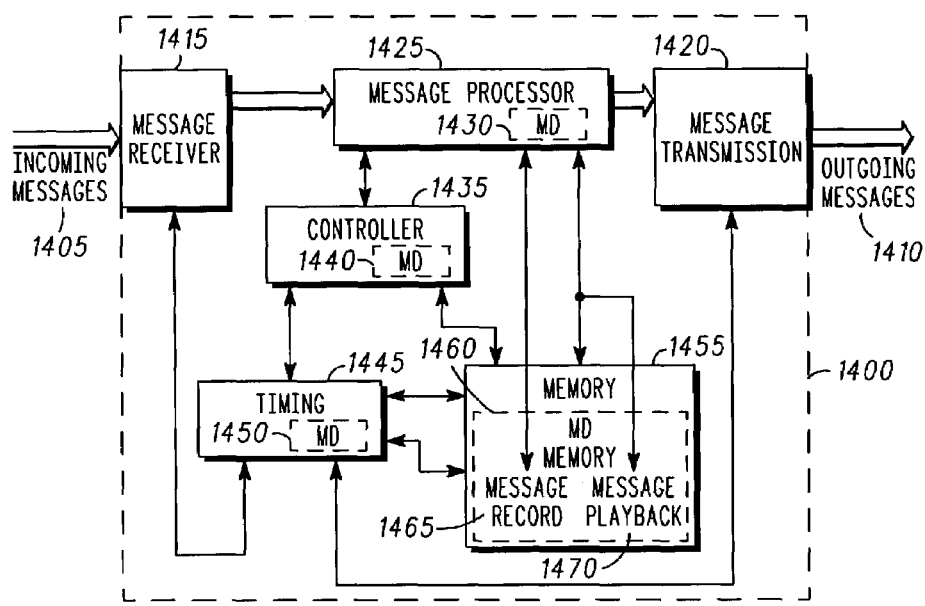
FIG. 14 is the internal functionality of a low power device operable as a MD, in accordance with certain embodiments of the present invention.

Referring now to FIG. 14, a system level block diagram 1400 of the internal operation of a low power communication device with MD functionality is shown according to the second embodiment of the invention. The low power communication device 1400 is capable of supporting specialized functionality for sending and receiving several types of MD messages, including the source communication device id, the destination communication device id, the message, time of desired communication, message replay requests, control words, and device status messages. This specialized functionality is in addition to the normal operational mode representative of the plethora of low power communication devices in the network. Incoming messages 1410 are received by message receiver 1415 of communication device 1400, and are prepared for processing by message processor 1425. Message processor 1425 contains further MD processing functionality 1430 that interacts with the MD functionality of a MD controller 1440, MD timing 1450, and MD memory 1460 in order to allow the communication device 1400 to receive, store, replay and process incoming messages 1405 from other communication devices in the network while acting as MD. Note that the communication device 1400 also contains the functionality illustrated in FIG. 5, but with additional MD functionality shown in dashed boxes. The MD memory 1460 of storage block 1455 also includes message playback 1470 and message record 1465 memory, so that MD processor 1430 can mediate requests from communication devices within the network to record messages, playback messages, and save communication device contact information. The MD timing block 1450 allows for synchronization between the communication device 1400 and other communication devices in the network, when communication device 1400 is acting as MD. Device transmitter 1420 receives messages from device processor 1425, prepares messages for transmission, and transmits outgoing messages 1410 to other communication devices in the network. One skilled in the art will recognize that the functional blocks illustrated in the system level block diagram 1400 of FIG. 14 may be modified or combined without departing from the spirit and scope of a low power communication device that sends messages, receives messages, and processes messages. In particular, it should be noted that the MD functionality shown in FIG. 14 may be further combined or isolated from the non-MD operation of communication device 1400, so long as the device 1400 is operable as a MD to the network.

Figure 15:
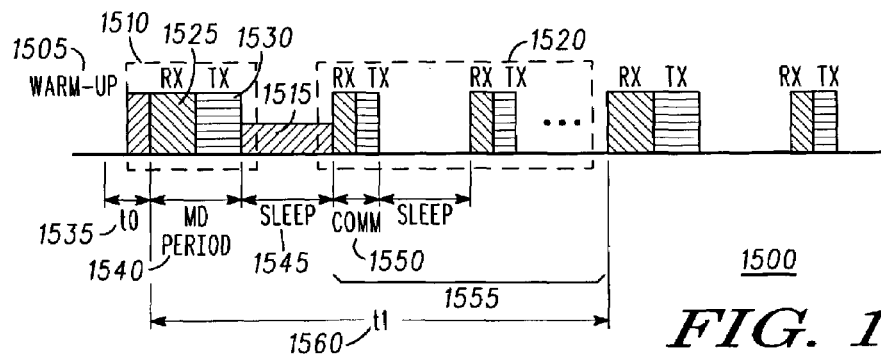
FIG. 15 illustrates a low communication duty cycle frame structure for a low power device functioning as a MD, in accordance with certain embodiments of the present invention.

Referring now to FIG. 15, a representative low communication duty cycle frame structure 1500 of low power communication device 1400 functioning as MD is shown. Low communication duty cycle frame structure 1500 contains several cycles of operation in which each cycle contains a plethora of frames that are repeated multiple times. A first frame of the plethora of frames of low communication duty cycle frame structure 1500 contains a random delay t0 block 1535, a warm-up block 1505, and a communication block 1510. The random delay has duration to 1535, where t0 is between 0 and the duration of a single transmit or receive period. This delay randomizes the start time of the communication devices in the network, so that the probability of multiple devices to function as MD concurrently is reduced. Warm-up block 1505 occurs next chronologically, and is a very small percentage of the overall frame duration. Warm-up block 1505 is followed by communication block 1510. Note that communication block 1510 and warm-up block 1505 directly follow the random delay t0 1535. However, it is also feasible for communication block 1510 and warm-up block 1505 to be delayed a random amount during the start of the next cycle of operation. In other words, the timing of communication block 1510 within the sequence of cycles is not constrained to be periodic. Communication block 1510 is a large percentage of the overall frame duration, and further comprises a receive slot 1525 and a transmission slot 1530. In the second preferred embodiment, the one receive slot 1525 precedes the one transmit slot 1530, although the order could be switched. Also, one of ordinary skill in the art will recognize that communication block 1510 could contain several transmit and receive slots in various arrangements. Also, although transmit slot 1530 occurs directly before or directly after receive slot 1525, the hardware contained in the transmitter and receiver will require some time to switch between the transmit and receive modes. The duration of the switching time can be dependent on the switching speed of the hardware in the communication devices, or it could be determined by a user specified parameter in the communication device processor.

After communication block 1510 ends, a second frame having a duration roughly one half of communication block 1510 begins. Second frame contains one sleep block 1515. Sleep block 1515 is a very high percentage of the overall frame duration. At the end of the second frame the low power communication device 1400 resumes low communication duty cycle operation starting with a third frame of the plethora of frames. The low communication duty cycle frame structure 1500 is shown in FIG. 6. Low communication duty cycle operation occurs for several frames of the plethora of frames of low communication duty cycle frame structure 1500. The duration of the first cycle of low communication duty cycle frame structure 1500 is a random number that is generated by the communication device 1400 at the start of the delay block 1535.

At the conclusion of the first cycle, the entire framing sequence just described is repeated until low power communication device 1400 stops functioning as MD. The decision to stop functioning as MD is made solely by the low power communication device 1400 in the second preferred embodiment, although it is also possible to coordinate the role of MD among several low power communication devices. Note that low power communication device 1400 contains the ability to generate and store random or pseudo-random numbers. These numbers could be generated by MD processor 1430, and stored in MD memory 1460.

Figure 16:
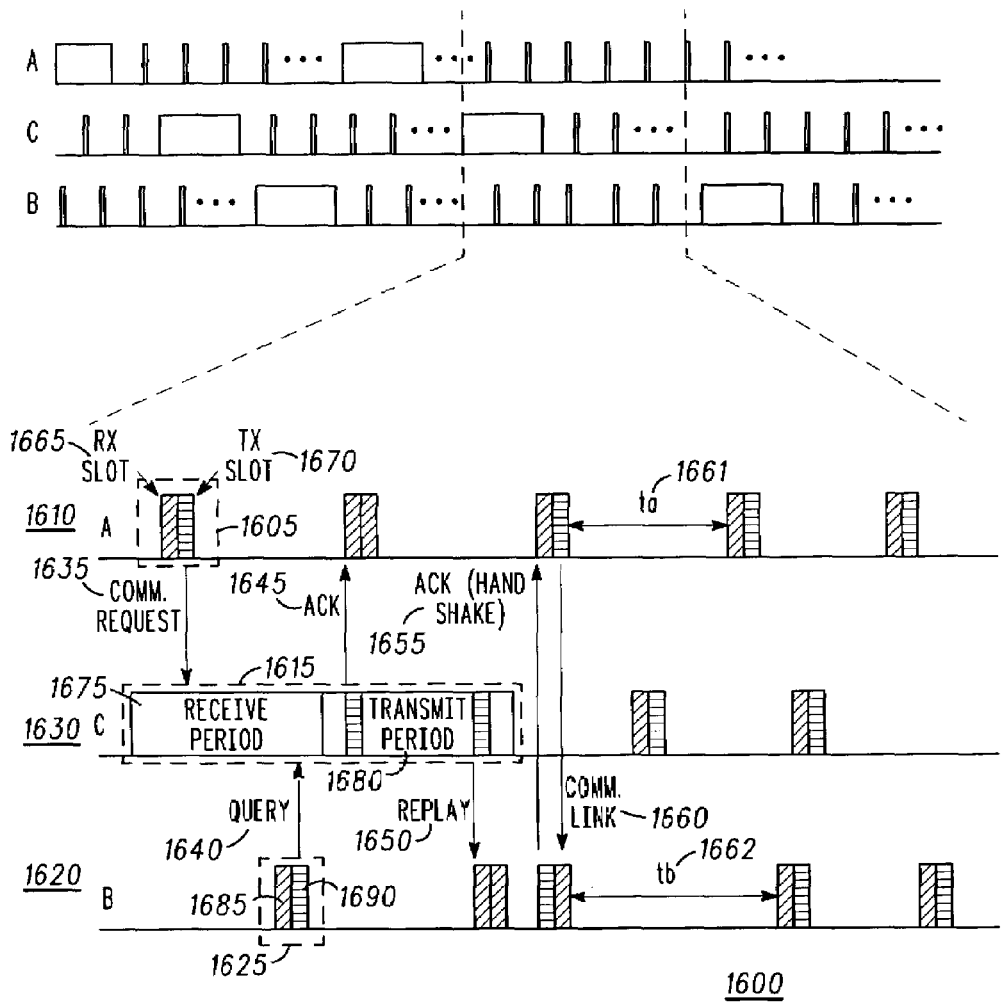
FIG. 16 is a timing diagram for communication between two low power devices and a third low power device acting as MD when the query occurs later than the communication request, in accordance with certain embodiments of the present invention.
Figure 17:
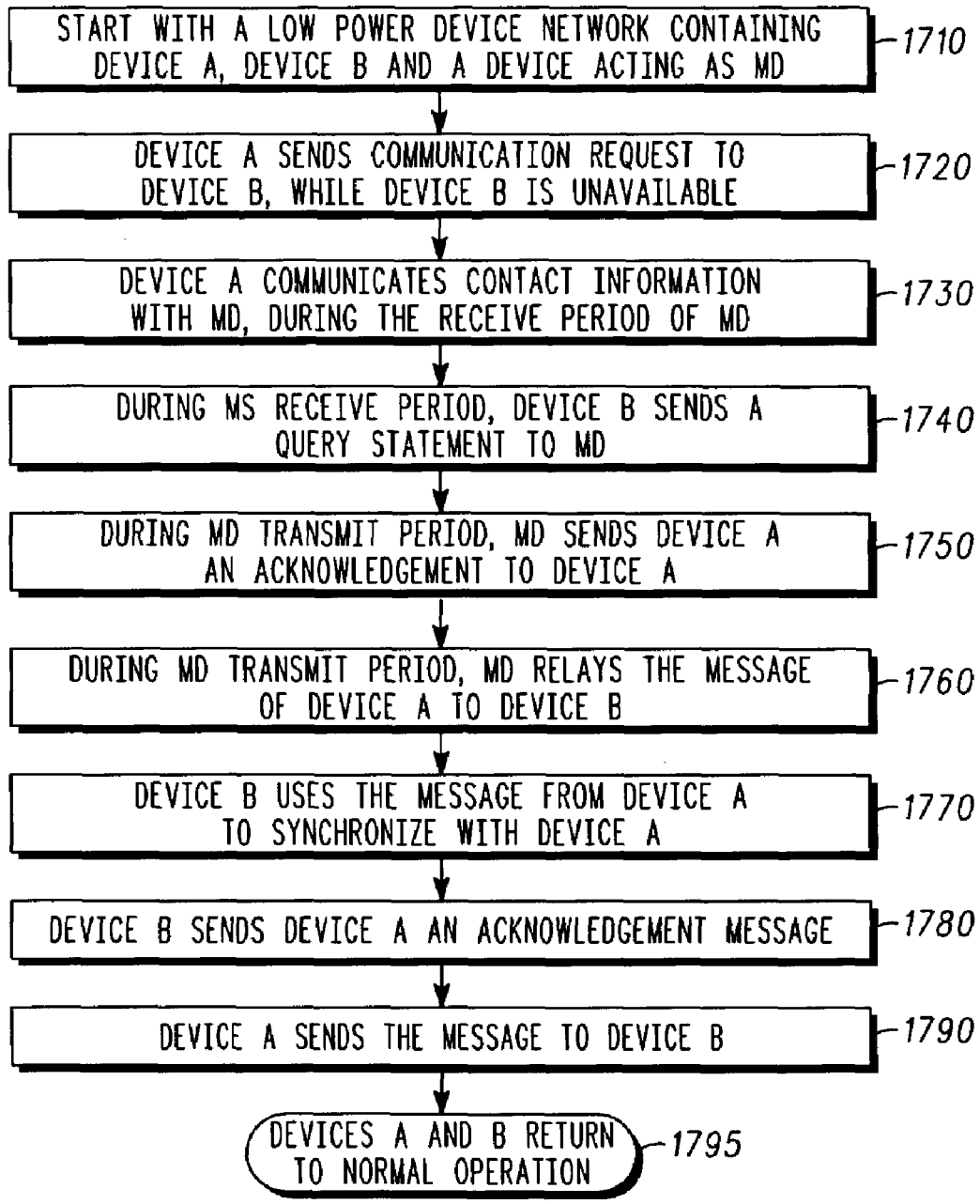
FIG. 17 is a flowchart of the communication between two low power devices and a third low power device acting as MD when the query occurs later than the communication request, in accordance with certain embodiments of the present invention.

Referring now to FIG. 16, a detailed timing diagram for a device A 1610 attempting to send a communication request to a device B 1630 using a device C 1620 acting as MD, according to the second embodiment, is shown. As in FIG. 9, device A 1610 first attempts to communicate with device B 1630 prior to a query request 1660 of device B 1630. The communication sequence shown in FIG. 16 for the second embodiment is identical to the communication sequence shown in FIG. 9 for the first embodiment. A difference between the FIG. 9 and FIG. 16 is that device C 1630 is a low power communication device acting as MD. Device A 1610 is a low duty cycle device with a communication period containing a receive slot 1665 and a transmit slot 1670. Device B 1620 is also a low duty cycle device with a communication period containing receive slot 1685 and transmit slot 1690. Device C 1630 contains a communication period that is much longer than either communication period of device A 1610 or device B 1620. The communication period of device C 1630 similarly contains a receive period 1675 and a transmit period 1680. Referring also to FIG. 17, the flowchart for the timing diagram of FIG. 16 is shown. The flow in block 1730 of FIG. 17, as well as the timing diagram of FIG. 16, assumes that device A 1610 has not been successful in communicating directly with device B 1620. So, there is a need for device A 1610 to use the device C 1630 to store a communication request with device B 1620. As shown in block 1730, device A 1610 sends a communication request 1635 to device C 1630 during the transmit slot 1670 of the communication period of device A 1610. Communication request 1635 is received by device C 1630 during the receive slot 1675 of the communication period of device C 1630. Also during the receive period 1675, device B 1620 enters its communication period. Upon waking, device B 1620 sends a query 1640 using transmit slot 1690 to device C 1630 to check for messages. Note, that both device A 1610 and device B 1620 are able to communicate with device C 1630 during a single receive slot 1675. The duration of receive slot 1675 and transmit slot 1680 of device C 1630 should be chosen to be large enough that device C 1630 is able to receive both communication requests and query messages. Since MD 1630 received communication request 1635 from device A 1610 prior to the query 1640 from device B 1620, during the transmission slot 1680 of the communication period of device C 1630, device C 1630 first sends an acknowledgement 1645 to device A 1610 during receive slot 1665 in the next communication period of device A 1610, as indicated in block 1750. Device C 1630 then sends a replay message 1650 to device B during the same transmit slot 1680 of the communication period of device C 1630, as indicated in block 1760.

Device B 1620 now has enough information to enable communications with device A 1610 without the use of device C 1630. In order to synchronize with device A, device B uses timing information provided in the communication request 1635 of device A 1610, and swaps communication slots so that the transmit slot 1690 precedes the receive slot 1685 of device B 1620. As shown in block 1780, device B 1620 then sends an acknowledgement 1655 to device A during the receive slot 1665 of the communication period of device A. As shown in block 1790, device A 1610 is now able to communicate a message 1660 to device B 1620 during the transmit slot 1670 of device A 1610 and the receive slot 1685 of device B 1620. Once the communication between device A 1610 and device B 1620 is complete, device A 1610 sleeps for a randomly generated duration ta 1661 and device B 1620 sleeps for a randomly generated duration tb 1662. Device A 1610 and device B 1620 then return to normal operation, as shown in block 1795.

Figure 18:
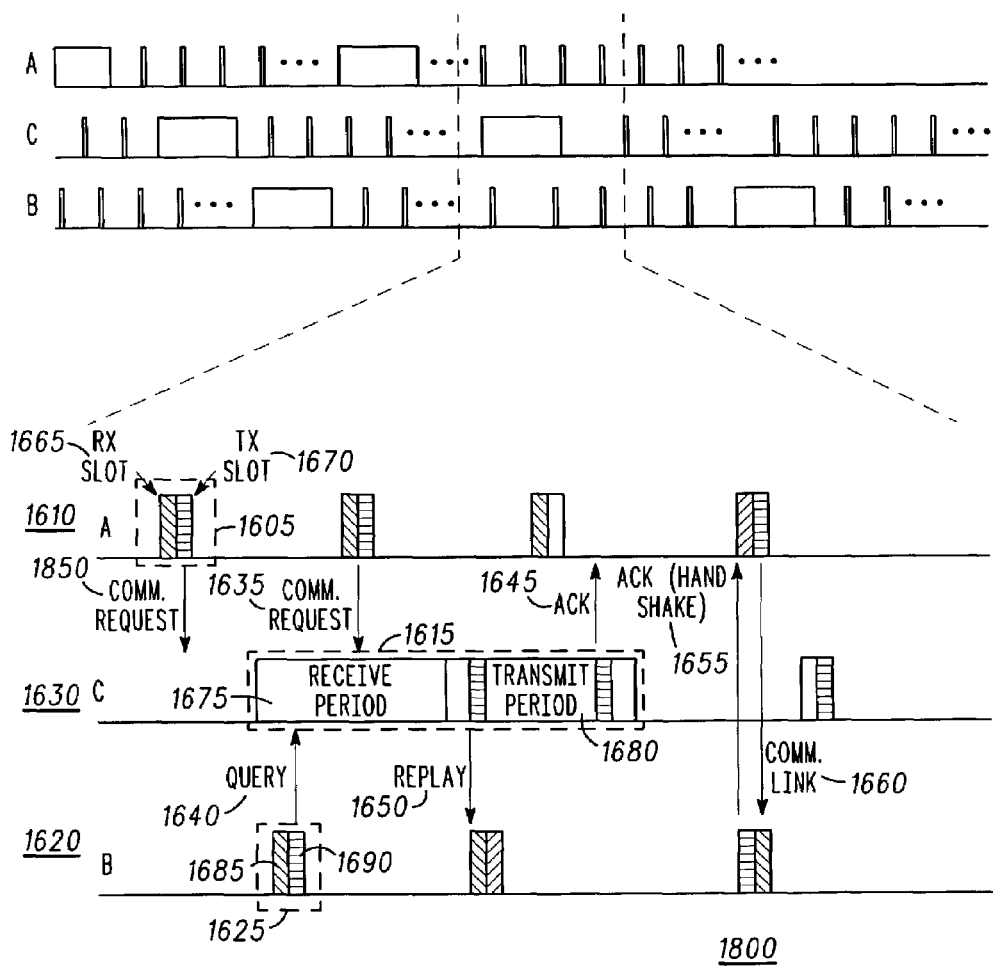
FIG. 18 is a timing diagram for communication between two low power devices and a third low power device acting as MD when the query occurs earlier than the communication request, in accordance with certain embodiments of the present invention.
Figure 19:
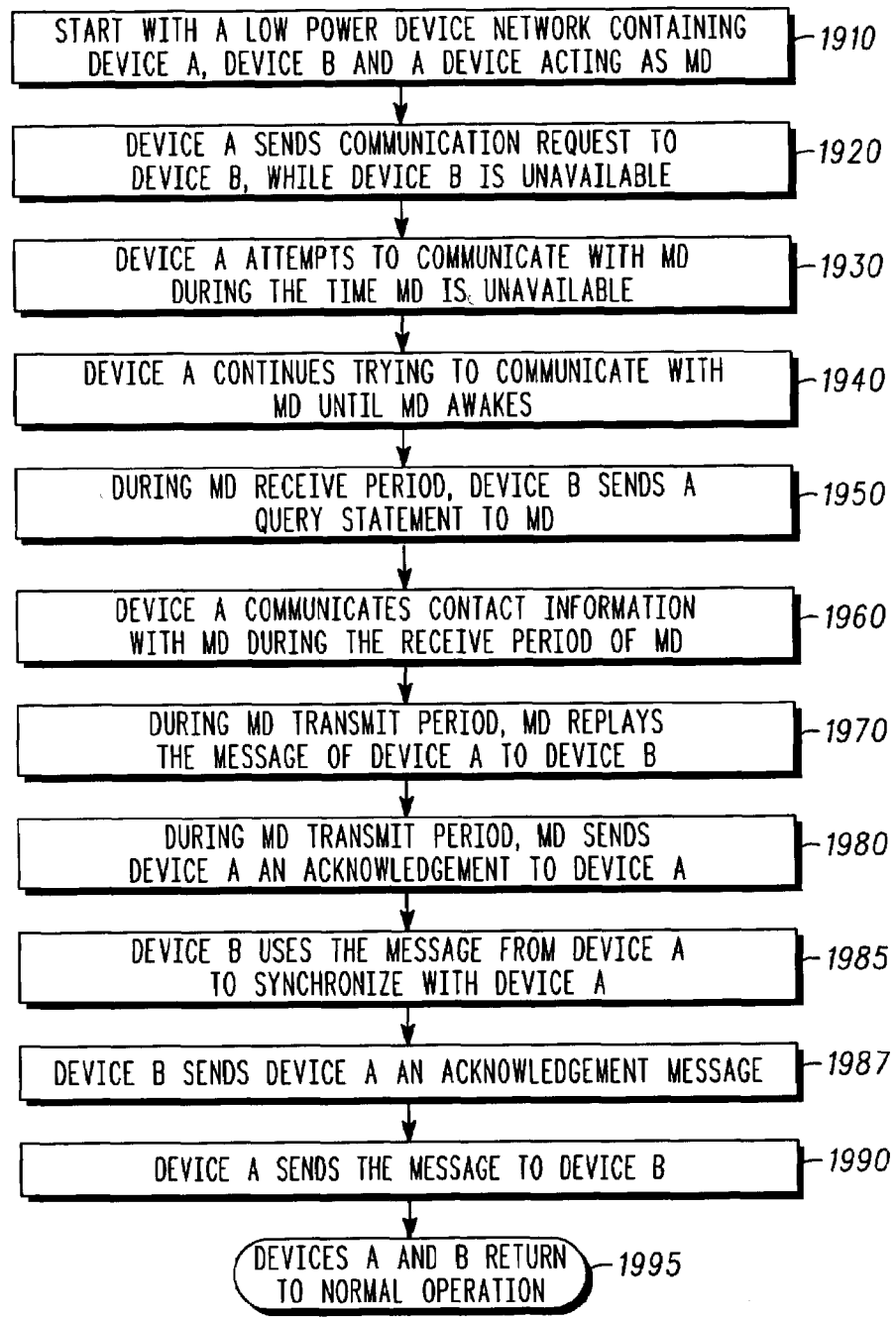
FIG. 19 is a flowchart for the communication between two low power devices and a third low power device acting as MD when the query occurs earlier than the communication request, in accordance with certain embodiments of the present invention.

The discussion above referring to FIG. 16 and FIG. 17, illustrated the sequence of communication operations and timing flow for the case in which the query from device B 1620 is later than the communication request from device A 1610, according to the second embodiment. It is also possible for the query of device B 1620 to precede the communication request of device A 1610. This scenario is illustrated in the timing diagram of FIG. 18, and the flowchart of FIG. 19. The sequence of operations shown in FIG. 18 is similar to those in FIG. 11, except that device C 1630 is a low power communication device functioning as a MD, rather than the dedicated MD 930 shown in FIG. 11. Since the device C 1630 is not available, the first communication request 1850 of device A 1610 is not received as shown in block 1930, and device A 1610 has to wait until a communication period in which device C 1630 has an active receive period 1675, as shown in block 1940. This delay means that device B 1620 sends query 1640 to the receive slot 1675 of device C 1630 prior to the communication request 1635 of device A 1610, as in block 1950. It is important to note that since both the transmit slot 1675 and receive slot 1680 of device C 1630 are as long as two transmit periods of device A 1610 or device B 1620, during the transmit slot of device C 1630, device C is able to replay message 1650 to device B 1620 and acknowledge 1645 device A 1610. This allows the handshake between device A 1610 and device B 1620 to proceed as in block 1985-1990. So, the ordering of the communication request 1635 and the query 1640 within a single receive slot 1675 and the ordering of replay 1650 and acknowledgement 1645 within a single transmit slot 1680 of device C 1630 does not affect establishment of communications between device A 1610 and device B 1620. Once the communication between device A 1610 and device B 1620 is complete, device A 1610 sleeps for a randomly generated duration ta 1661 and device B 1620 sleeps for a randomly generated duration tb 1662.

Figure 20:
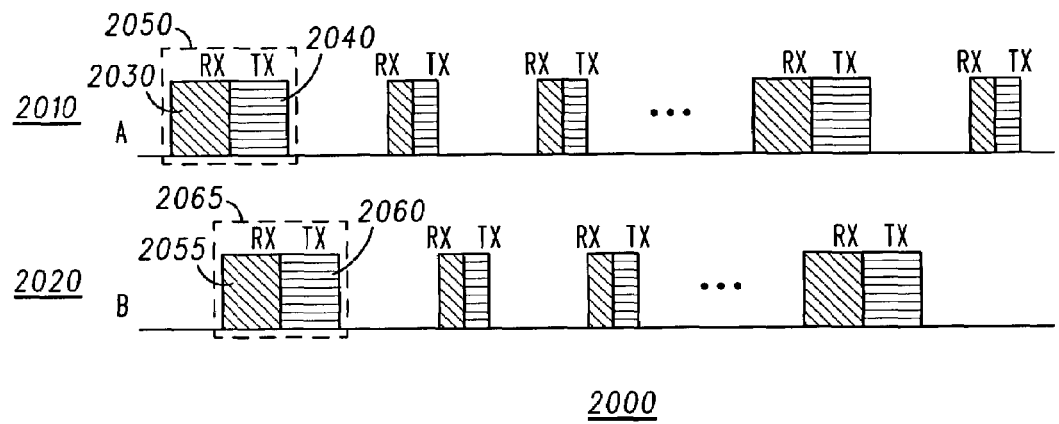
FIG. 20 is a timing diagram illustrating a collision between two low power devices acting as MD when a collision avoidance strategy is not used, in accordance with certain embodiments of the present invention.

For the second embodiment of the present invention, it is possible for two communication devices within the network to independently decide to function as MD's at the same time. If this occurs, then it is possible that the transmit periods of the two devices of the two devices overlap and a collision results. This situation is illustrated in FIG. 20. Device A 2010 first starts to function as MD. A short time later, a second device B starts to function as MD. When transmission slot 2040 of device A 2010 overlaps transmission slot 2060 of device B 2020, the two transmitters interfere and communications capability is degraded. Note that the issue of collision is only a problem when the transmitters in the communication devices within the network occupy overlapping frequency bands and the communicated bit rate/bandwidth is high. If the transmitter data is modulated using a spreading waveform, then the communication devices could occupy the same frequency band and collisions could be less of an issue. According to the preferred second embodiment, each of the communication devices are single-channel devices using the same transmission frequency, so that the collision issue must be addressed.

Figure 21:
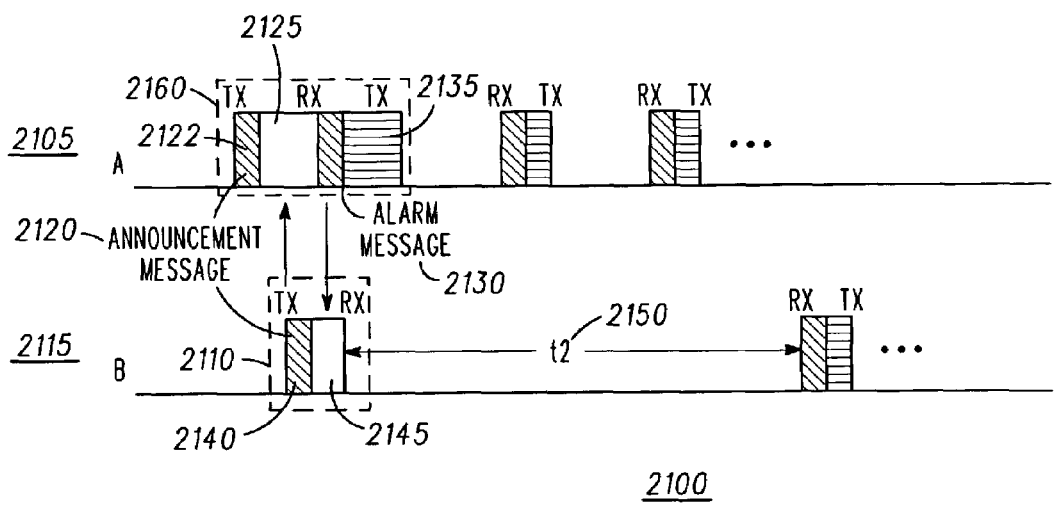
FIG. 21 is a timing diagram illustrating the collision avoidance strategy between two low power devices acting as MD, in accordance with certain embodiments of the present invention.
Figure 22:
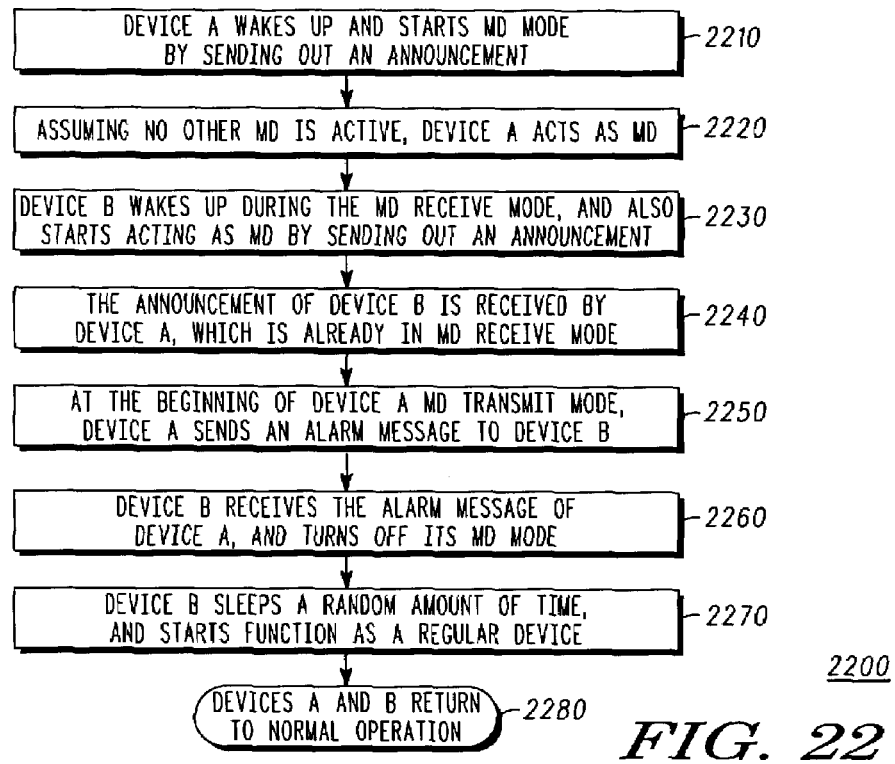
FIG. 22 is the collision avoidance strategy flowchart, in accordance with certain embodiments of the present invention.

Referring now to the timing diagram of FIG. 21, and the flowchart of FIG. 22, a collision avoidance strategy is described according to the second embodiment of the present invention. Device A 2105 is randomly selected as MD prior to device B 2115. At the start of the MD mode of device A 2105, device A transmits announcement message 2120 (block 2210) in a very short duration transmission slot 2122, and then switches to receive slot 2125 of communication period 2160 (block 2220). Device B 2115 is then randomly selected as MD, and device B 2115 sends out announcement message 2120 (block 2230) in a very short duration transmission slot 2140 prior to switching to receive slot 2145 of communication period 2160. Device A receives the announcement message 2120 of device B 2115 (block 2240) during receive slot 2125, and generates alarm message 2130 during it's next transmit period 2135 (block 2250). Device B 2115 receives this alarm message 2130 during receive period 2145, and immediately stops acting as MD (block 2260). Device B 2115 then sleeps a random amount of time t2 to prevent future collisions and resumes operation as a normal low power communication device (block 2270). Instead of sleeping for t2 seconds, device B 2115 could wait until the end of the MD communication period of device A 2105. At this time, device B 2115 functions as a MD, since device A 2105 is not in communication period 2160.

According to the second preferred embodiment, the random initial offset t0 1535 is between 0 and 1 sleep period 1545, the amount of delay ta 1661 and tb 1662 are between 0 and 1 sleep period 1515, and the cycle time t1 1560 follows the inequality, 0.5T<t1<1.5T, where T is the average frequency of the communication period of a communication device acting as MD.

The second embodiment of the present invention presents a protocol and structure for a network of low power communication devices to improve the reliability of inter-device communication through the use of a Mediation Device (MD). One issue with this approach is the reliability when the number of communication devices in the network is small. As an example, if the network contains only five communication devices, and the MD communication cycle of each is 1000 seconds (t1), then the average latency will be roughly 200 seconds. One way to reduce the latency is to constrain all nodes to communicate within a specified time window.

Figure 23:
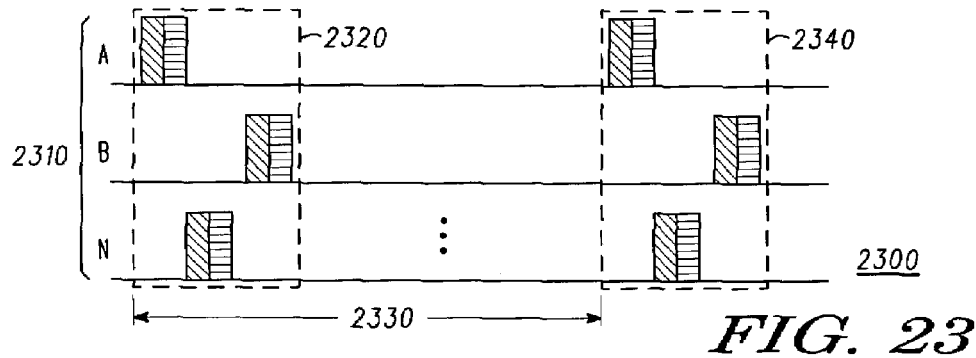
FIG. 23 is a timing diagram for a multiple access scheme for a small network of low power devices, wherein each device is operable as a MD, in accordance with certain embodiments of the present invention.

Referring to FIG. 23, a multiple access scheme in which N communication devices 2310 are in the network, according to a third embodiment of the present invention. Each communication device of the N communication devices is constrained to receive and transmit information within a window 2320 of duration Tw seconds. Duration Tw is selected from the size of the network as determined by the number of communication devices in the network.

For example, for a network with five communication devices operating within a t1 period of 1000 seconds, the average latency is 200 seconds. If the communication cycle t1 is reduced to 300 seconds, the average latency is reduced by a factor of three. If the duration Tw of window 2320 is smaller than the communication period of the communication device, the duration of the communication period must be reduced to fit within window 2320. Reducing the duration of the communication period increases the likelihood of communication devices moving out of communication range without the knowledge of communication device acting as MD. Also, new communication devices entering the network will not be recognized unless their communication period lies within the window 2320.

Figure 24:
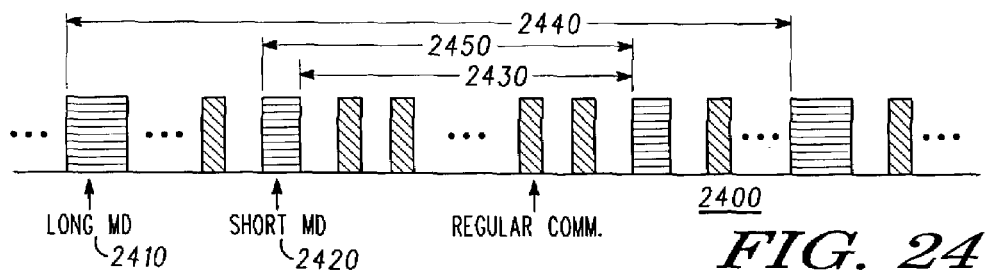
FIG. 24 is a low communication duty cycle frame structure for a multiple access scheme for a small network of low power devices, wherein each device is operable as a MD, in accordance with certain embodiments of the present invention.

One solution to this is illustrated in FIG. 24, according to the third embodiment of the present invention. The timing diagram 2400 of FIG. 24 shows a communication device which has a shortened communication period so that the communication device is able to communicate within window 2420. In order to check for new communication devices, or recognize the loss of existing communication devices, a long communication period 2410 is occasionally used when the communication device is acting as MD. This long communication period 2410 is followed by the low power communication duty cycle 2430 structure of FIG. 6, and additional short MD communication periods 2420. With the exception of the long communication periods 2410, the communication device has essentially the same low communication duty cycle frame structure illustrated in FIG. 15 of the second embodiment.

As an example of the third embodiment, a long communication period 2410 of 2 seconds, a short communication period 2420 of 200 ms, and the normal low communication duty cycle mode with a communication period of 2 ms is used. The frequency of the long communication period 2410 is 1500 seconds, the frequency of the short communication period is 300 seconds, and the frequency of the normal communication period is 1 second. This leads to a duty cycle of about 0.4%.

It is noted that the communication device described herein may be a NeuRFon® device or any suitable communication device having similar operating characteristics.

The multiple access protocol and structure for communication devices in an asynchronous network environment described above may be further augmented by the introduction of new protocols in the network that will enable one or more mediation devices, whether operating in a dedicated or distributed mode, to provide data processing capabilities to other communication devices, such as NeuRFo® devices or nodes, in the network. Data processing capabilities provided by an MD include communication, store and forward, data aggregation, and data fusion capabilities as will be discussed. These capabilities are provided by the additional functions of packet caching, removal of replicated packets, and multiple communication types performed by one or more MDs in the asynchronous communications network. The creation of a common synchronization schedule of an MD expands the functionality of the MD to enable point-to-point (unicast), point-to-multipoint (multicast), and broadcast communication among network communication devices (nodes). Communication devices within transmission range of an MD may simply reference the timing and duty cycle contained within the MD's common synchronization schedule, thereby informing them of when to wake-up and how to adapt to a variety of duty cycles of devices in the network without having to engage in additional communications with the MD.

This added functionality can significantly reduce the number of messages carried throughout the network and therefore provides tremendous savings in the amount of power utilized by the network communication devices. Moreover, the quality of data being exchanged between communication devices may be enhanced as well.

The improved data processing capabilities are applicable to both dedicated and distributed mode MDs and are implemented and controlled by the processing and control blocks of the MD (referred to by reference numerals 340, 350, 540, 550 and discussed above). As previously noted, the processing and control functions may reside in the same or separate parts of the MD.

Multiple Communications

Once a MD and its associated duty cycle have been established, the MD's neighbors must be ascertained. This can be accomplished by the creation of a table listing all of MD's neighboring communication devices or an active scan in which a message is broadcast requesting a response from all communication devices in range to see who replies. A priori information can be used as well, in which permissible devices to communication with are contained in an Access Control List, for instance. Knowing which communication devices are in range of the MD, allows the MD to service communication requests it might receive from one or more communication devices.

Whereas the MD is perfectly capable of facilitating direct communications between two or more communication devices, as described at length above in regards to point-to-point communications, the MD may additionally facilitate communications of varying types between two or more communication devices. These communications include multicast communications, or point-to-multipoint communications, in which a source communication device or node, such as communication device A, wishes to send a message or other communication to multiple destination devices, like devices B, C, D, etc., which may be configured in a group having a group address. Also included are broadcast communications in which a source communication device or node A wishes to send a message or communication to every device within range. The MD functions as a facilitator of such communications by providing a common reference schedule that is used by the target destination devices to ensure that they receive the desired messages in a manner that minimizes message traffic on the network and thus promotes network device power efficiency.

Please note that in FIGS. 25-27, receive periods or slots by a device are indicated as blank periods occurring below the time line of the device while transmit periods or slots are shown as hatched above the time line.

Figure 25:
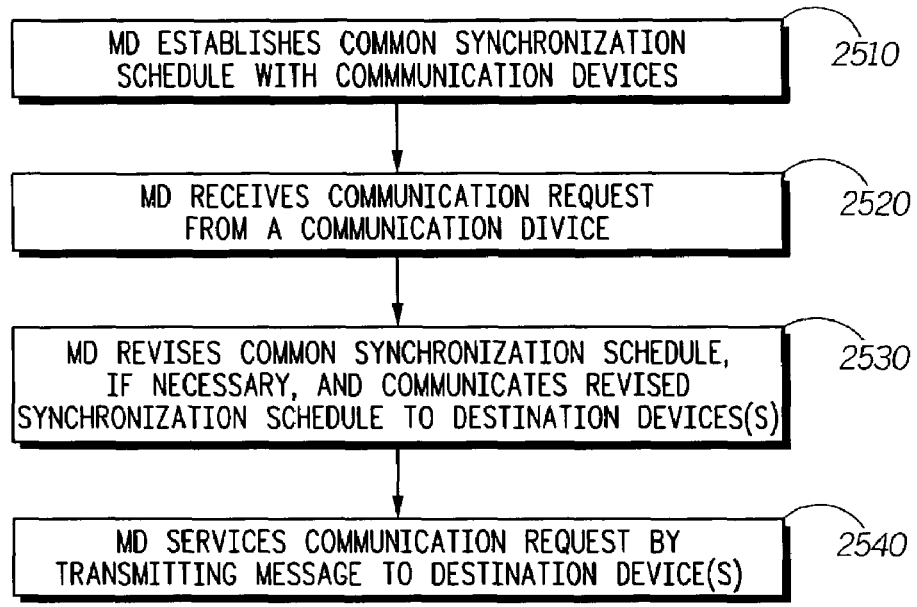
FIG. 25 is a flowchart for intra-network communications facilitated by a MD, in accordance with certain embodiments of the present invention.

Referring now to FIG. 25, flow 2500 illustrates an overall process for MD facilitation of network communications. In Block 2510, the MD establishes a common synchronization schedule with communication devices that will allow the communication devices to wake up and be ready to participate in a time span of sufficient overlapping duration, called the reference communication window. The size of the reference communication window is subject to the stability of the reference clock of the devices of interest, the number of neighboring communication devices, and the logical position of the MD in the overall architecture of the network, defined in part by the amount of message traffic on average experienced by a MD. The position of the window for the MD to communicate with other nodes need not be fixed and may occur before or after the beacon, for instance. The common synchronization schedule of the MD may be established upon a regular communication device becoming the MD, in the case of a distributed mode network, or at any time where it is necessary or proper to establish or re-establish a common synchronization schedule. As indicated by Block 2530, the need to revise the common synchronization schedule or to generate a new one may occur in response to the MD receiving a request for communications by a non-MD communication device, at Block 2520.

Figure 26:
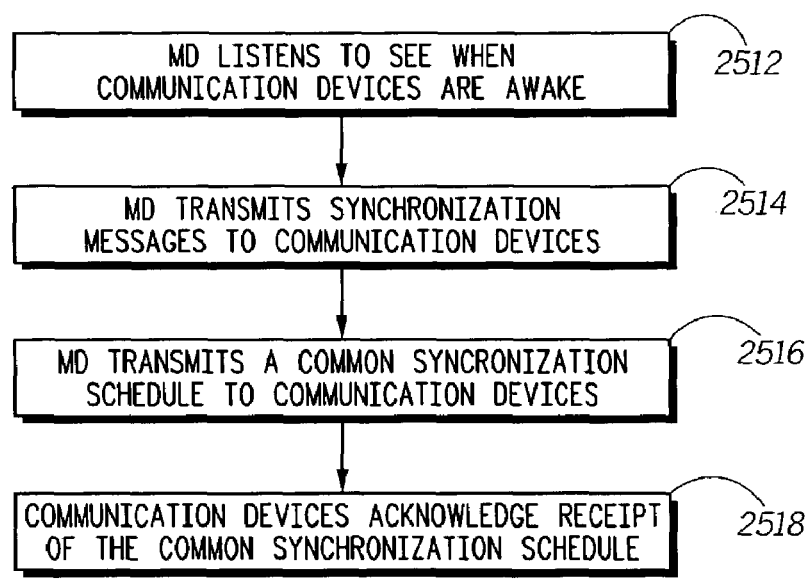
FIG. 26 is a flowchart illustrating establishment of a common synchronization schedule, in accordance with certain embodiments of the present invention.
Figure 27:
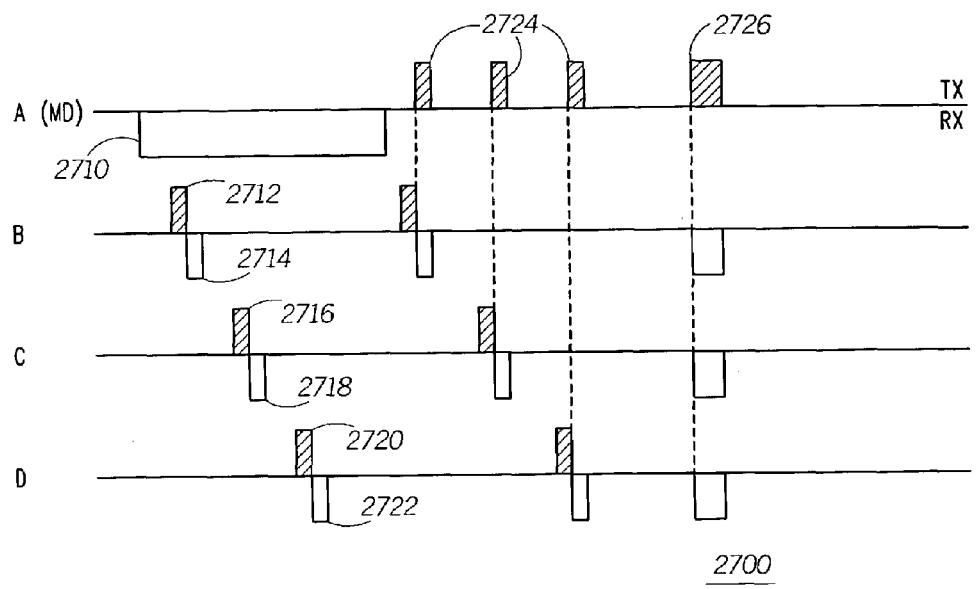
FIG. 27 is a timing diagram illustrating synchronization of an asynchronous network, in accordance with certain embodiments of the present invention.

Establishing the synchronization schedule is discussed in greater detail in conjunction with FIG. 26. At some point, which may actually be before or after the synchronization window is established and communicated to the non-MD devices, the MD may receive a communication request from a communication device with which it is in communication. This communication request, as noted above, may prompt a new or revised common synchronization schedule to be communicated to the communication devices involved in the communication request, namely the destination or target communication devices. Once the common synchronization schedule has been established and communicated, the MD can service the communication request by sending the communication message to the intended recipients at Block 2540.

The flow 2510 of FIG. 26 illustrates the creation and establishment of the common synchronization schedule of Blocks 2510 and 2530. The flow is further illustrated by FIGS. 27-30, which are referenced herein as well. At Block 2512, the MD listens on the network to see when the communication devices of interest, such as neighboring nodes or intended recipient destination devices, will be awake and available to receive. In FIG. 27, the MD, in this exemplary embodiment a communication device A behaving as the MD in a distributed mode network, listens and hears during its receive slot 2710 communication devices B, C, and D on the network during their respective transmission slots 2712, 2716, 2720, such as during periodic beacon transmissions. The length of the receive period of MD should be long enough to hear the beacons or other periodic transmissions of all the other target communication devices. At Block 2514 this allows the MD to send synchronization messages to the communication devices at the proper time for receipt by devices B, C, and D. This is illustrated by synchronization messages 2724 of FIG. 27. The synchronization message may contain packet and frame fields sufficient to communicate to the group when the MD will be transmitting a subsequent message to the devices.

The MD can next send a message containing a common synchronization schedule, shown as 2726, at Block 2516 at a time when it will be received by devices B, C, and D. The common synchronization schedule provides information needed by the devices to be available to receive messages sent to them by other communication devices via the MD. This information may include, by way of example and not limitation, the MD's clock (a common reference clock) and duty cycle schedule, the clock schedules of other devices on the network, the time window, referred to as the reference communication window, of sufficient overlapping duration to allow participating devices to wake up and participate in the communication, and the schedule of availability of the MD to receive message requests, which may be some period of time following the MD's beacon. For instance, in its beacon, the MD can communicate how long it will be open to receive message, thereby causing the non-MD devices to optionally change their beacon timing (phase) accordingly. Moreover, the synchronization schedule may additionally provide priority or quality of service (QoS) rules concerning the sequence in which various communication types (broadcast, multicast, unicast) are to occur. For instance, in accordance with the concept of shortest job first or "SJF," unicast messages, which are easier to respond to than broadcast message, would be serviced first. As the facilitator of communications in the network, the MD makes scheduling decisions and communicates them to other network devices.

Synchronization of communication devices to a common reference clock provided by the MD allows these same communication devices to obtain the duty-cycle schedule exhibited by the MD thereafter. In this sense, the synchronization schedule need only be aware of the common reference clock provided by the MD. Additional information can be communicated to the devices by the MD as needed in accordance with the common reference clock. This ability of the communication devices to synch up with the MD facilitates streamlined delivery of messages by the MD to the destination devices as needed.

Following receipt of the synchronization schedule, the communication devices may acknowledge receipt of this information to the MD at Block 2518. Acknowledgement, while not required, is advantageous before the MD sends communication messages out on the network. There are several approaches that may be utilizes to provide the MD with acknowledgment. They include acknowledging at a random time after receipt of the message from the MD (illustrated in FIG. 28), acknowledging during a subsequent predetermined scheduled transmission slot, such as during the next scheduled beacon time (FIG. 29), and acknowledging by means of an "implied acknowledge" (as in FIG. 30).

Figure 28:
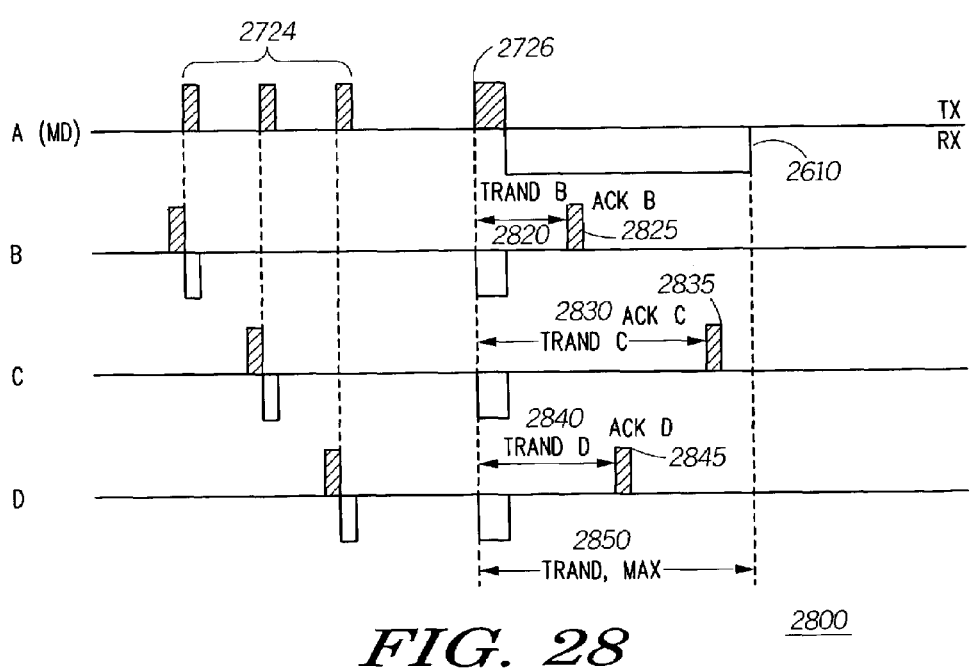
FIGS. 28-30 are timing diagrams illustrating various approaches to acknowledging a common synchronization schedule, in accordance with certain embodiments of the present invention.
Figure 29:
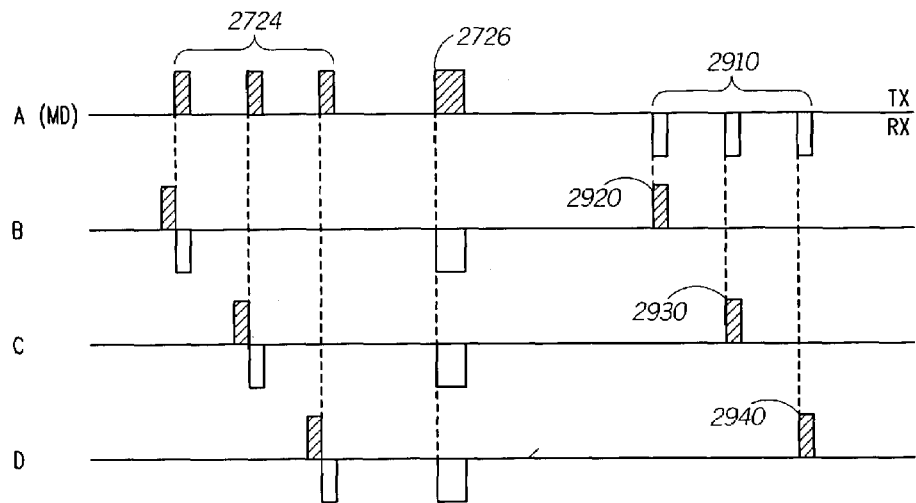
Figure 30:
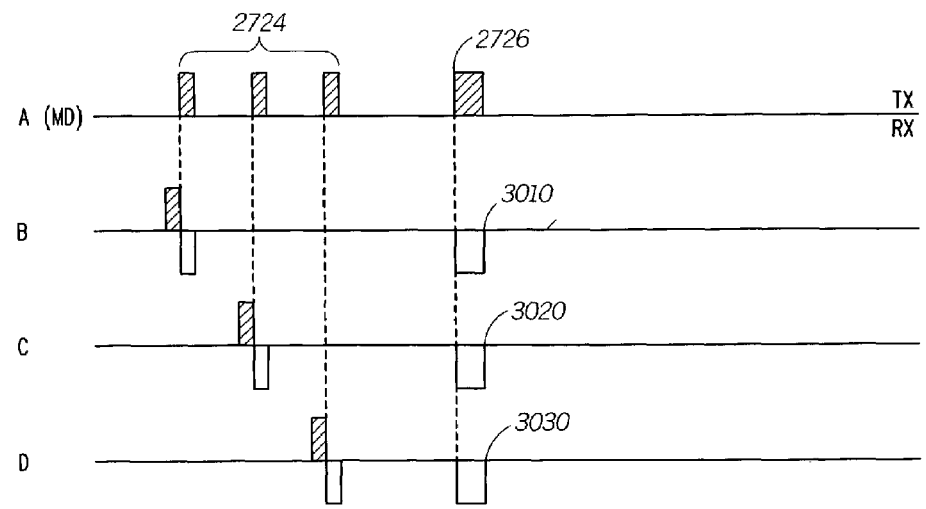

Referring now to FIGS. 28-30, following receipt of the synchronization message 2724 and subsequently message 2726 containing needed synchronization schedule information, communication devices B, C, and D can communicate acknowledgment of receipt of message 2726 in various ways. In the timing diagram 2800 of FIG. 28, acknowledgement by the devices can occur at any time during an extended receive period 2610 of the MD that follows transmission of message 2726. Communication device B sends acknowledgement AckB 2825 at some random time TrandB 2820 following the start of MD's communication period. Similarly, communication device C transmits AckC 2835 after some random time TrandC 2830 following the beginning of MD's communication period. D transmits AckD 2845 after random period TrandD 2840. It can be seen that this approach maximizes the time during which MD must be available to receive, Trand, max 2850, to be equal to the entire communication period of MD. In those networks in which MD and the other communication devices send out beacons, this may be for the entire beacon period as shown. The requirement that MD be operable to receive this entire period increases its power consumption, thereby degrading power performance.

In the timing diagram 2900 of FIG. 29, acknowledgment by the communication devices occurs during a subsequent transmission slot, such as a beacon period, allowing the MD to conserve precious battery power. Devices B, C, and D communicate acknowledgments during their next regularly scheduled beacon period 2920, 2930, 2940, respectively. The MD can save battery during most of its post-transmission period.

Once the devices B, C, and D send their acknowledgements, whether via a dedicated acknowledgement packet (FIG. 28) or beacon (FIG. 29), future beacon packets may be sent at the original beacon periods of these devices.

A so-called "implied acknowledge" may be utilized for acknowledgment purposes as well, as illustrated in the timing diagram 3000 of FIG. 30. In this case, no acknowledgment is affirmatively sent following the receipt of message 2726 by communication devices B, C, D during their receive periods 3010, 3020, and 3030, respectively. These devices can just send their next regularly scheduled beacon.

Figure 31:
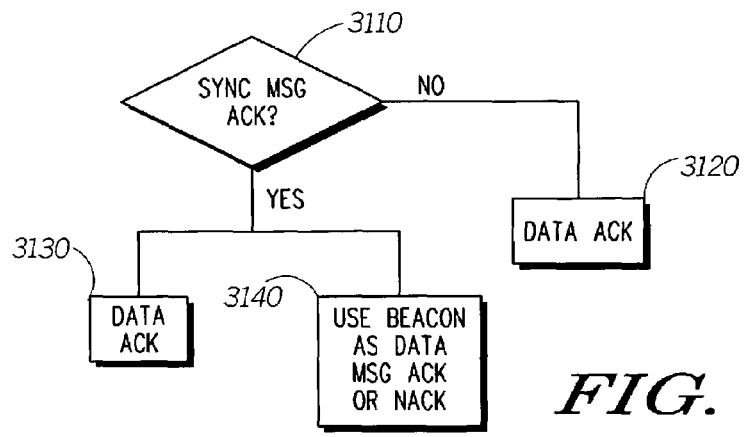
FIG. 31 is a flowchart illustrating various approaches to acknowledging a common synchronization schedule, in accordance with certain embodiments of the present invention.

Flow 3100 of FIG. 31 further illustrates the acknowledgement aspect in accordance with certain embodiments of the invention. At Decision Block 3110, the inquiry is whether acknowledgement of the synchronization message 2724 is in order. If no, this may indicate that the synchronization message 2724 and/or the message 2726 were never received. A data acknowledgement may be sent at Block 3120 if desired. If a synchronization acknowledgement is to be sent, then acknowledgement may be sent via a normal acknowledgement message 3130 or as embedded within a beacon at Block 3140. FIGS. 28-31 illustrate that the manner in which acknowledgement of synchronization information may occur is quite varied.

Referring back again to FIG. 25, the MD may be receive communication requests from its non-MD communication devices at any time. Requests preferably follow the establishment of a synchronization schedule by the MD with its communication devices, in which the communication devices know when to communicate with the MD about this and other network matters. And, as discussed above, the receipt of a communication request by the MD may prompt it to accordingly change the synchronization schedule or revise which communication devices receive this information (Block 2530).

The manner in which the MD services a communication request may vary in response to the type of communication request received by it. In the case of a multicasting request received from a source communication device A within range of the MD to a group of multiple destination devices B, C, D, etc. also within range of the MD, the MD will send synchronization schedule information to the addresses of these destination devices to cause them to be available to receive the message. At the scheduled time, MD delivers the packets of information of the message (which originated from A) directly to communication devices B, C, D of the group. In the case of a group of communication devices denoted by a common group address, the MD may successfully service the multicast message request by sending out one message to the group address.

Multicast communication may be typical of situations in which a node disseminates an attribute-based information query. As it is communication from a single source communication device to the addresses of multiple destination devices, via the MD, multicasting may require a longer reference communication window than other types of communications. However, once a group of multiple communication devices adopts a common duty cycle schedule, dictated by the common synchronization schedule set forth by the MD, multicasting may be performed with a minimum number of network messages.

Broadcast communications, in which a communication device wishes to send a message to every other device or node within range in the network, are also facilitated by the MD. The broadcast address for broadcast messaging in a network is typically set and known by the communication devices of the network. This means that the source device, such as A, may directly broadcast its message using the broadcast address, such as 0XFF for a 16 bit system, since in a multi-hop network, every device receiving a broadcast message will automatically forward it to other devices within its ranging, called "flooding the network." Alternately, source device A can still communicate its request directly to the MD and ask it to make sure the message is broadcast to every device within range of the MD. The common synchronization schedule is utilized to cause all other devices on the network (the destination devices) to align their schedule of duty-cycles to that of the MD. Only the MD will hear the request and re-broadcast the message in the manner previously described. The reference communication window size can be expected to be smaller than that for multicasting and point-to-point communications.

It was earlier seen how the MD can allow a communication device to communicate directly with other communication device, simply by making available the transmission schedules of the involved devices. The MD may also be used to facilitate point-to-point or unicast communications itself. The common synchronization schedule described herein is useful for coordinating the low-duty cycle schedules of the non-MD communication devices. A device wishing to transmit a message and knowing the MD's schedule (the reference communication window) from the common synchronization schedule, can transmit its communication request to the MD when it knows it will be awake and receptive to receiving communications requests. During a subsequent window, such as the next window, communication devices associated with the communication request may communicate directly, either randomly or in a scheduled manner. Any nodes that were unable to engage in desired communications, may participate in a point-to-point communication during a subsequent reference communication window by using the MD to schedule a communication period for them.

Direct communications between the MD and the destination devices B, C, D reduces the amount of messages carried through the network and therefore can enhance the overall power consumption of the devices on the network in the aggregate. Multicast, broadcast, and even point-to-point (unicast) communications can be done more efficiently than arranging direct device to device communications. The overall network system benefits from a reduction in the number of rounds of message exchanges, leading to a reduction of the number of sleep to-wake transitions that must be made by a non-MD communication device.

Caching and Replication Removal

Network performance can be further enhanced by reducing the amount of network traffic through the elimination or reduction of unnecessary message traffic between network devices. Two approaches for achieving this through the use of caching and removal techniques in an asynchronous network environment employing multiple low power, low duty cycle communication devices and at least one MD communication device (operating in either a distributed or a dedicated mode).

Caching data is a technique that successfully reduces the amount of network traffic and works particularly well in a dedicated mode environment in which the MD may have considerably more energy reserves and memory capacity than its non-MD neighbors. It also can work well in the distributed mode network by reducing the number of redundant messages on the network to improve power efficiency. The MD will store off data packets, received in the course of servicing earlier communications requests, in a memory buffer, thereby relieving the data storage demands on non-MD devices with smaller memory capacities. Data packets that are requested and reside in MD memory can be provided to the requesting communication device without having to request the same data again from the source device, thereby eliminating an unnecessary communication on the network.

Figure 32:
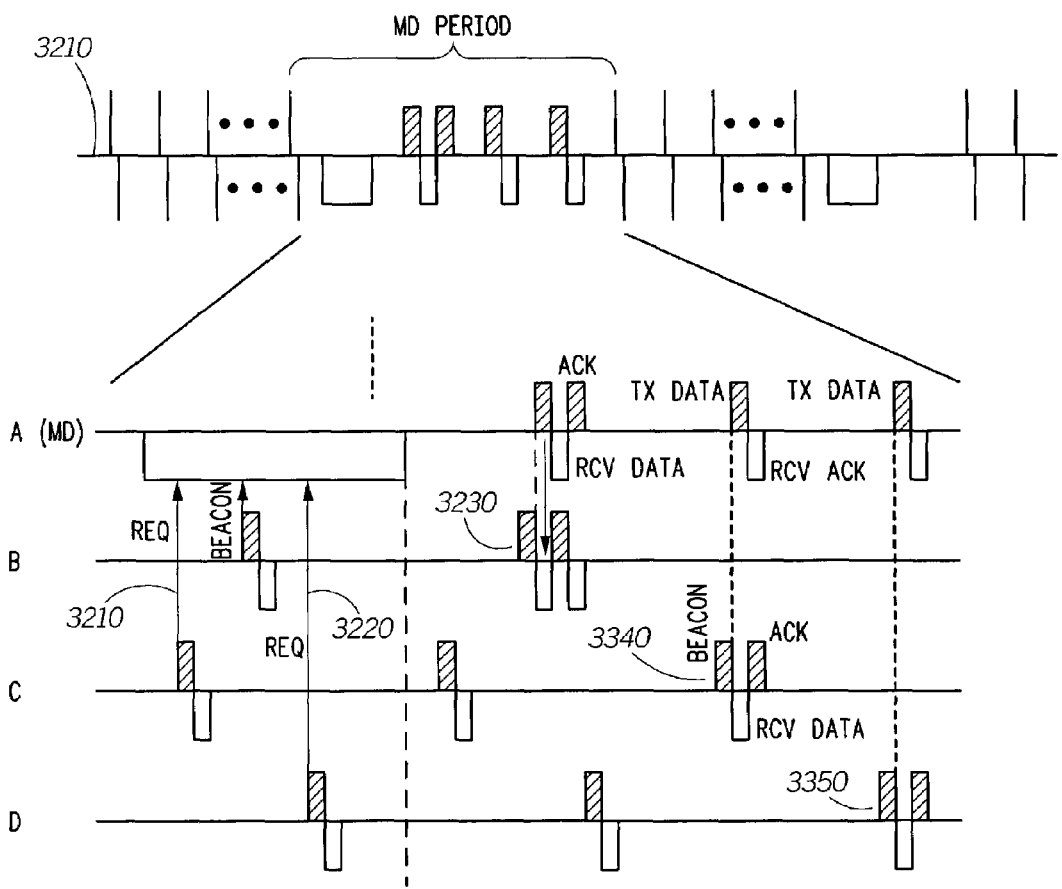
FIG. 32 is a timing diagram that illustrates the use of caching, various approaches to acknowledging a common synchronization schedule, in accordance with certain embodiments of the present invention.

Consider the timing diagram 3200 of FIG. 32 in which MD device efficiently services requests for data from communication devices B and C for data from device A. During MD's receive period, the MD received a request 3210 from communication device B for data from communication device A. Later in the receive period, MD additionally receives a request 3220 for the same data from device C. From A's previous beacon, the MD knows when device A will be listening and sends a request 3230 for the data to device A. Device A immediately sends it to the MD, which acknowledges received of the data (ACK) and stores it. During B's sequent receive period 3340, the MD transmits the stored data to device B, which transmits a receive acknowledgement as shown. The MD subsequently transmits the same data to device C during its next receive period 3350.

Importantly, the MD does not send another request for the same data to device A, having saved off the data in its buffer. The MD can deliver cached data to "interested" nodes directly. It provides a way to provide needed data without having to use unnecessary, multiple unicasts. Non-MD devices are spared the overhead of exchanging synchronization information during transmissions that drain battery power. Caching data in this manner saves duplicative or unnecessary transmissions that, in the aggregate, can yield significant reduction in network traffic and thus boost network power efficiency.

It is envisioned that caching may be structured a number of ways and in accordance with particular system demands. The MD may cache data only temporarily, for a set period of time, until it becomes stale, indefinitely, etc.

A further technique for at least reducing unnecessary traffic in the asynchronous network of the present invention is removal of identical messages and it builds upon the caching capability discussed above. Identical data packets, originating from the same or multiple sources but intended for the same destination communication device, may be discarded. The MD can compare incoming packets against previously cached packets and discard those that are identical before transmitting the packet to the destination node or communication device. Such duplicate packages may represent a significant portion of the total number of packets in the network and this filtering out of redundant packets can reduce the total number of message exchanges. It can be seen that the caching and filtering improvement discussed herein may be a valuable enhancement to the servicing of communication requests by the MD in accordance with Block 2540 of FIG. 25.

Those of ordinary skill in the art will recognize that the present invention has been described in terms of exemplary method embodiments and that these embodiments may be implemented by means of computer-readable media tangibly embodying a program of instructions executable by a computer or programmed processor, as well as hardware equivalent components such as special purpose hardware and/or dedicated processors. Similarly, general purpose computers, microprocessor based computers, micro-controllers, optical computers, analog computers, dedicated processors and/or dedicated hard wired logic may be used to construct alternative equivalent embodiments of the present invention. Such alternatives should be considered equivalents.

The present invention may accordingly be implemented using one or more programmed processor executing programming instructions that are broadly described above in flow chart form and which can be stored in any suitable electronic storage medium. However, those skilled in the art will appreciate that the processes described above can be implemented in any number of variations and in many suitable programming languages without departing from the present invention. Thus, the process can be described by a set of instructions implementing the processes described and stored on a computer storage medium such as a magnetic disc, optical disc, magneto-optical disc, semiconductor memory, etc. Many such variations and modifications are contemplated and considered equivalent.

While the invention has been particularly shown and described with reference to a preferred embodiment, it will be understood by those skilled in the art that various changes in form and detail may be made therein without departing from the spirit and scope of the invention. For example, one of ordinary skill in the art will recognize that low power devices may by physically connected or wireless, without departing from the spirit and scope of the invention. In the first, second, and third preferred embodiments, single-channel communication devices are contained in each of the first, second and third preferred embodiments. Also, for each preferred embodiment, the transmit slot and receive slot of a communication device of the plurality of communication devices do not overlap. For all three embodiments, the duty cycle is defined as the fraction of time that the communication device is in either a transmit slot or a receive slot. Also for all three embodiments, the communication device is assumed to be a low communication duty cycle, low power, wireless device, but, again, this need not be the case.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of facilitating communications between one or more of a plurality of communication devices of an asynchronous network, comprising:
    determining a first communication schedule of a first communication device of the plurality of communication devices and a second communication schedule of one or more of the plurality of communication devices;
    a mediation device of the asynchronous network establishing a common synchronization schedule from the first and second communication schedules, further comprising:
        the mediation device transmitting a synchronization message to the plurality of communication devices when the mediation device knows the plurality of communication devices will be able to receive the synchronization message; and the mediation device transmitting the common synchronization schedule to the plurality of communication devices in accordance with the synchronization message, wherein the common synchronization schedule provides information needed by the first and second communication devices to be available to receive messages sent to them via the mediation device; and upon receiving a communication request from the first communication device, the mediation device initiating transmittal of and transmitting a message received from the first communication device of the plurality of communication devices to the one or more of the plurality of communication devices when the one or more of the plurality of communication devices are available to receive the message in accordance with the common synchronization schedule.

2. The method of claim 1, further comprising: each of the plurality of communication devices acknowledging receipt of the common synchronization schedule if the common synchronization schedule is received.

3. The method of claim 2, wherein acknowledging receipt of the common synchronization schedule comprises: each of the plurality of communication devices that received the common synchronization schedule transmitting an acknowledge message at a random time during a receive period of the mediation device that follows the transmission of the common synchronization schedule by the mediation device.

4. The method of claim 2, wherein acknowledging receipt of the common synchronization schedule comprises: each of the plurality of communication devices that received the common synchronization schedule transmitting an acknowledge message to the mediation device at a predetermined beacon transmission slot.

5. The method of claim 2, wherein acknowledging receipt of the common synchronization schedule comprises: each of the plurality of communication devices that received the common synchronization schedule transmitting a regularly scheduled beacon transmission of the communication device following receipt of the common synchronization schedule.

6. The method of claim 1, further comprising: if data of the message has been previously cached in memory, the mediation device discarding the message and sending the cached data to the one or more of the plurality of communication devices.

7. The method of claim 1, wherein the mediation device transmits the message received from the first communication device to a second communication device in accordance with the common synchronization schedule and a unicast communication request received from the first communication device.

8. The method of claim 1, wherein the mediation devices transmits the message received from the first communication device to multiple communication devices of the plurality of communication devices in accordance with the common synchronization schedule and a multicast communication request received from the first communication device.

9. The method of claim 8, wherein the multiple communication devices are of a group identified by a group address in the multicast communication request from the first communication device and the MD transmits the message to the group address.

10. The method of claim 1, wherein the mediation devices transmits the message received from the first communication device to the plurality of communication devices in accordance with the common synchronization schedule and a broadcast communication request received from the first communication device.

11. An asynchronous communications network, comprising:

a plurality of communication devices of the asynchronous communications network;

a mediation device (MD) of the asynchronous communications network operable to facilitate communications between a first communication device and one or more communication devices of the plurality of communication devices;

wherein the MD facilitates communications between the first communication device and the one or more communication devices in accordance with a common synchronization schedule managed by the MD and wherein the MD establishes the common synchronization schedule from a first communication schedule of the first communication device and a second communication schedule of the one or more communication devices, wherein to establish the common synchronization schedule the MD further:

transmits a synchronization message to the plurality of communication devices when, the mediation device knows the plurality of communication devices will be able to receive the synchronization messages; and transmits the common synchronization schedule to the plurality of communication devices in accordance with the synchronization message, wherein the common synchronization, schedule provides information needed by the first and second communication devices to be available to receive messages sent to them via the mediation device; and wherein upon receipt of a communication request to transmit a message received from the first communication device, the MD initiates transmittal of and transmits the message to the one or more communication devices when the MD knows that the one or more communication devices are available to receive the message in accordance with the common synchronization schedule.

12. The network of claim 11, wherein the MD transmits a message received from the first communication device to the one or more communication devices in accordance with the common synchronization schedule and a communication request received by the MD from the first communication device.

13. The network of claim 12, wherein the communication request is a unicast communication request from the first communication device to transmit the message to a second communication device of the plurality of communication devices and the MD transmits the message to the second communication device in accordance with the common synchronization schedule.

14. The network of claim 12, wherein the communication request is a multicast communication request from the first communication device to transmit the message to multiple communication devices of the plurality of communication devices and the MD transmits the message to the multiple communication devices in accordance with the common synchronization schedule.

15. The network of claim 14, wherein the multiple communication devices are of a group identified by a group address in the multicast communication request from the first communication device and the MD transmits the message to the group address.

16. The network of claim 12, wherein the communication request is a broadcast communication request from the first communication device to transmit the message to the plurality of communication devices and the MD transmits the message to the plurality of communication devices in accordance with the common synchronization schedule.

17. The network of claim 11, wherein the asynchronous network operates in one of a distributed mode with the MD being a second communication device of the plurality of communication devices and a dedicated mode with the MD being a dedicated mediation device in the asynchronous network.

18. The network of claim 11, wherein the common synchronization schedule is established and communicated to the plurality of communication devices by the MD.

19. The network of claim 11, wherein the MD establishes the common synchronization schedule in response to a communication request received from the first communication device.

20. The network of claim 11, wherein the MD establishes the common synchronization schedule upon becoming the mediation device.

21. The network of claim 11, wherein if data from the first communication device to be transmitted to a second communication device of the plurality of communication devices has been cached in a memory element, the mediation device discards the data from the first communication device.

22. A first communication device of a plurality of communication devices operable to facilitate communications between the plurality of communication devices in an asynchronous network, comprising:
    a processing and control element that establishes and manages a common synchronization schedule based upon a communication schedule of one or more of the plurality of communication devices of the asynchronous network;
    a receiver, coupled to and controlled by the processing and control element, that receives a communication request to send a message to the one or more of the plurality of communication devices; and
    a transmitter, coupled to and controlled by the processing and control element, that in response to the receiver receiving the communication request initiating transmittal of and transmitting the message to the one or more communication devices in accordance with the common synchronization schedule,
    wherein the common synchronization schedule provides information needed by the first and second communication, devices to be available to receive messages sent to them via the mediation device, and
    wherein the common synchronization schedule is established by the processing and control element causing the transmitter to transmit a synchronization message to the plurality of communication devices when the first communication device knows the plurality of communication devices will be able to receive the synchronization message and causing the transmitter to transmit the common synchronization schedule to the plurality of communication devices in accordance with the synchronization message.

23. The device of claim 22, wherein the receiver further receives one or more acknowledgements from one or more of the plurality of communication devices that received the common synchronization schedule.

24. The device of claim 22, wherein the processing and control element establishes the common synchronization schedule in response to a communication request received from a second communication device.

25. The device of claim 22, wherein the communication request is a unicast communication request and the transmitter transmits the message to a second communication device in accordance with the unicast communication request and the common synchronization schedule.

26. The device of claim 22, wherein the communication request is a multicast communication request and the transmitter transmits the message to multiple communication devices of the plurality of communication devices in accordance with the multicast communication request and the common synchronization schedule.

27. The device of claim 22, wherein the communication request is a broadcast communication request and the transmitter transmits the message to the plurality of communication devices in accordance with the broadcast communication request and the common synchronization schedule.

28. The device of claim 22, wherein the first communication device facilitates communications between the plurality of communication devices during one or a distributed mode of operation and a dedicated mode of operation.

29. The device of claim 22, further comprising: a memory element of the first communication device, wherein if data of the message has been previously cached in the memory element, the processing and control element discards the message and causes the transmitter to transmit the cached data to one or more of the plurality of communication devices.

30. The device of claim 22, wherein the processing and control element causes the transmitter to transmit the common synchronization schedule to the plurality of communication devices by the MD.

31. A method for facilitating communications between one or more of a plurality of communication devices of an asynchronous network, comprising: a first communication device of the plurality of communication devices transmitting a communication request to a mediation device to transmit a message to one or more of the one or more communication devices; the mediation device receiving the communication request from the first communication device; and the mediation device initiating transmittal of and transmitting the message to the one or more communication devices when the one or more communication devices are available to receive the message in accordance with a common synchronization schedule managed by the mediation device, wherein the common synchronization schedule provides formation needed, by the plurality of communication devices to be available to receive messages sent to them via the mediation device, wherein the common synchronous schedule is determined from a first communication schedule of the first communication device of the plurality of communication devices and a second communication schedule of the one or more communication devices and wherein establishing the common synchronization, schedule further comprises:
    the mediation device transmitting a synchronization message to the plurality of, communication devices when the, mediation device knows the plurality of communication devices will be able to receive the synchronization message; and
    the mediation device transmitting the common synchronization schedule to the plurality of communication devices in accordance with the synchronization message.

32. The method of claim 31, further comprising: each of the plurality of communication devices that receives the common synchronization schedule transmitting an acknowledge message at a random time during a receive period of the mediation device that follows the transmission of the common synchronization schedule by the mediation device.

33. The method of claim 31, further comprising: each of the plurality of communication devices that receives the common synchronization schedule transmitting an acknowledge message to the mediation device during a predetermined transmission slot.

34. The method of claim 31, further comprising: each of the plurality of communication devices that receives the common synchronization schedule transmitting a regularly scheduled transmission following receipt of the common synchronization schedule.

35. The method of claim 31, wherein the communication request is a unicast communication request and further comprising: the mediation device transmitting the message to a second communication device in accordance with the common synchronization schedule.

36. The method of claim 31, wherein the communication request is a multicast communication request and further comprising: the mediation device transmitting the message to multiple communication devices in accordance with the common synchronization schedule.

37. The method of claim 31, wherein the communication request is a broadcast communication request and further comprising: the mediation device transmitting the message to the plurality of communication devices in accordance with the common synchronization schedule.

38. Computer-readable media tangibly embodying a program of instructions executable by a computer to facilitate communications between one or more of a plurality of communication devices of an asynchronous network, the method comprising: determining a first communication schedule of a first communication device of the plurality of communication devices and a second communication schedule of one or more of the plurality of communication devices; a mediation device of the asynchronous network establishing a common synchronization schedule from the first and second communication schedules; further comprising:
- the mediation device transmitting a synchronization message to the plurality of communication devices when the mediation device knows the plurality of communication devices will be able to receive the synchronization message, and
- the mediation device transmitting the common synchronization schedule to the plurality of communication devices in accordance, with the synchronization message,
- wherein the common synchronization schedule provides information needed by the first and second communication devices to be available to receive messages sent to them via the mediation device; and
- upon receiving a communication request from the first communication device, the mediation device initiating transmittal of and transmitting a message received from the first communication device of the plurality of communication devices to the one or more of the plurality of communication devices when the one or more of the plurality of communication devices are available to receive the message in accordance with the common synchronization schedule.

39. Computer-readable media tangibly embodying a program of instructions executable by a computer to facilitate communications between one or more of a plurality of communication devices of an asynchronous network, comprising:
- a first communication device of the plurality of communication devices transmitting a communication request to a mediation device to transmit a message to one or more of the one or more communication devices;
- the mediation device receiving the communication request from the first communication device; and
- the mediation device initiating transmittal of and transmitting the message to the one or more communication devices when the one or more communication devices are available to receive the message in accordance with a common synchronization schedule managed by the mediation device, wherein the common synchronous schedule provides information needed by the plurality of communication devices to be available to receive messages sent to them via the mediation device, wherein the common synchronous schedule is determined from a first communication schedule of the first communication device of the plurality of communication devices and a second communication schedule of the one or more communication devices and wherein establishing the common synchronization schedule further comprises:
- the mediation device transmitting a synchronization message to the plurality of communication devices when the mediation device knows the plurality of communication devices will be able to receive the synchronization message; and
- the mediation device transmitting the common synchronization schedule to the plurality of communication devices in accordance with the synchronization message.

* * * * *